United States Patent [19]
Baker et al.

[11] Patent Number: 5,640,332
[45] Date of Patent: Jun. 17, 1997

[54] MULTIMEDIA GRAPHICS SYSTEM

[75] Inventors: David C. Baker, Austin, Tex.;
Jonathan I. Siann, San Diego, Calif.

[73] Assignee: Brooktree Corporation, San Diego, Calif.

[21] Appl. No.: 648,542

[22] Filed: May 16, 1996

Related U.S. Application Data

[63] Continuation of Ser. No. 214,787, Mar. 16, 1994, abandoned.

[51] Int. Cl.$^6$ .................... G11B 27/031; H04N 5/00
[52] U.S. Cl. .................. 364/514 A; 345/197; 345/198; 345/132; 348/564; 348/589; 395/806
[58] Field of Search ..................... 364/514 A, 514 B, 364/514 C, 514 R; 345/115, 197, 198, 132; 348/564, 589; 395/154

[56] References Cited

U.S. PATENT DOCUMENTS

| | | | |
|---|---|---|---|
| 4,267,560 | 5/1981 | Ishikawa et al. | 358/22 |
| 4,486,746 | 12/1984 | Walker | 340/750 |
| 4,496,976 | 1/1985 | Swanson et al. | 358/147 |
| 4,599,611 | 7/1986 | Bowker et al. | 340/721 |
| 4,606,068 | 8/1986 | Habitzreiter et al. | 382/56 |
| 4,740,832 | 4/1988 | Sprague et al. | 358/21 R |
| 4,745,462 | 5/1988 | Dischert et al. | 358/21 R |
| 4,755,937 | 7/1988 | Glier | 364/200 |

(List continued on next page.)

FOREIGN PATENT DOCUMENTS

| | | |
|---|---|---|
| 0454414 | 10/1991 | European Pat. Off. . |
| 0492795 | 7/1992 | European Pat. Off. . |
| 0493881 | 7/1992 | European Pat. Off. . |
| 0524468 | 1/1993 | European Pat. Off. . |
| 0597218 | 5/1994 | European Pat. Off. . |
| 0601647 | 6/1994 | European Pat. Off. . |
| 0610829 | 8/1994 | European Pat. Off. . |
| 9321574 | 10/1993 | WIPO . |

OTHER PUBLICATIONS

Cirrus Logic, Inc., "Pixel Semiconductor Announces Breakthrough Family of Video Chips for Multimedia Applications". Aug. 03, 1992.

Corcoran, "Pixel Chips to boost AVI Video Quality", Info-World. Aug. 17, 1992.

(List continued on next page.)

Primary Examiner—Emanuel T. Voeltz
Assistant Examiner—Patrick Assouad
Attorney, Agent, or Firm—Ellsworth R. Roston; Charles H. Schwartz

[57] ABSTRACT

Words of different types of digital information, including standard interframe video (SIF), graphics, television and audio are transferred preferably in packets between a controller, storage memory and shift registers (e.g. FIFO's) individually associated with the different information types. For a VRAM memory, information is transferred in parallel, controlled by tag bus information, from the controller to the memory and then serially to the FIFO's, all at a frequency higher than a clock frequency in a monitor raster scan. The tag bus information is decoded and introduced to an additional FIFO. A state machine processes such additional FIFO information and transfers the digital information to the different FIFO's at times controlled in each line by such additional FIFO—e.g. particular times in each line for the SIF and graphics and, thereafter, for television and audio, at times unrelated to any times in such line. The graphics transfer is timed to substantially fill, but not overflow, in such line the limited capacity of the associated FIFO. Their limited capacities cause the television and audio FIFO's to stop receiving words when filled to particular limits. For a DRAM memory, parallel information is transferred, dependent upon the tag bus information, between the controller, memory and FIFO's at the clock frequency. In a "Rambus" system, a bus common with the controller, memory and FIFO's provides control and timing words. Such words control information transfer in successive words through the common bus to the controller, memory and FIFO's upon such timing and control.

126 Claims, 6 Drawing Sheets

U.S. PATENT DOCUMENTS

| | | | |
|---|---|---|---|
| 4,779,144 | 10/1988 | Dischert et al. | 358/337 |
| 4,821,208 | 4/1989 | Ryan et al. | 364/518 |
| 4,907,086 | 3/1990 | Truong | 358/183 |
| 5,097,257 | 3/1992 | Clough et al. | 340/814 |
| 5,129,036 | 7/1992 | Dean et al. | 392/2 |
| 5,192,999 | 3/1993 | Graczyk et al. | 358/85 |
| 5,229,855 | 7/1993 | Siann | 358/183 |
| 5,250,933 | 10/1993 | Beaudin et al. | 345/115 |
| 5,262,861 | 11/1993 | Hertz | 358/150 |
| 5,272,520 | 12/1993 | Kanoh et al. | 358/150 |
| 5,274,753 | 12/1993 | Roskowski et al. | 395/135 |
| 5,274,779 | 12/1993 | Stewart et al. | 395/425 |
| 5,283,819 | 2/1994 | Glick et al. | 379/90 |
| 5,291,187 | 3/1994 | Wood et al. | 345/185 |
| 5,297,231 | 3/1994 | Miller | 395/2.1 |
| 5,327,156 | 7/1994 | Masukane et al. | 345/113 |
| 5,333,135 | 7/1994 | Wendorf | 370/94.1 |
| 5,333,299 | 7/1994 | Koval et al. | 395/550 |
| 5,345,554 | 9/1994 | Lippincott et al. | 395/162 |
| 5,367,301 | 11/1994 | Stiltner et al. | 341/144 |
| 5,369,729 | 11/1994 | Norris | 395/2.67 |
| 5,377,018 | 12/1994 | Rafferty | 358/433 |
| 5,402,147 | 3/1995 | Chen et al. | 345/115 |
| 5,406,306 | 4/1995 | Siann et al. | 345/115 |
| 5,432,900 | 7/1995 | Rhodes et al. | 395/154 |
| 5,488,393 | 1/1996 | Wood et al. | 345/213 |

OTHER PUBLICATIONS

IBM Technical Disclosure Bulletin, V. 34, N. 10B (Mar. 1992) "Utilization of Motion Detection Information..." pp. 119–121.

Developer Kit for Sound Blaster, Hardware Programming Reference, 2nd Edition, Oct. 1993, Creative labs, pp. 3–1 to 3–29.

K. Jack, Video Demystified A Handbook for the Digital Engineer, 1993, pp. 106–196.

International Telecommunication Union ITU–R Recommendations, 1994 BR Series Volume; Sound and Television Recording.

International Telecommunication Union ITU–R Recommendations, 1994 BT Series Volume; Broadcasting Service (Television).

Minimal Requirements for SAFB DAC, Jan. 21, 1992.

Pixel Semiconductor, CL–PX2080 MediaDAC Datasheet, May 29, 1992.

Pixel Semiconductor, CL–PX2080 MediaDAC Preliminary Data Sheet, Nov. 1992.

DVI Technology, i750 Video Processor Technical Specifications, 1990.

82750DB Programming Guide, Harney et al, Jan. 7, 1991.

The i750 Video Processor: A Total Multimedia Solution, Harney et al, Jan. 7, 1991.

Teleconferencing Invades the Desktop, Milt Leonard, Electronic Desgn, Aug. 6, 1992.

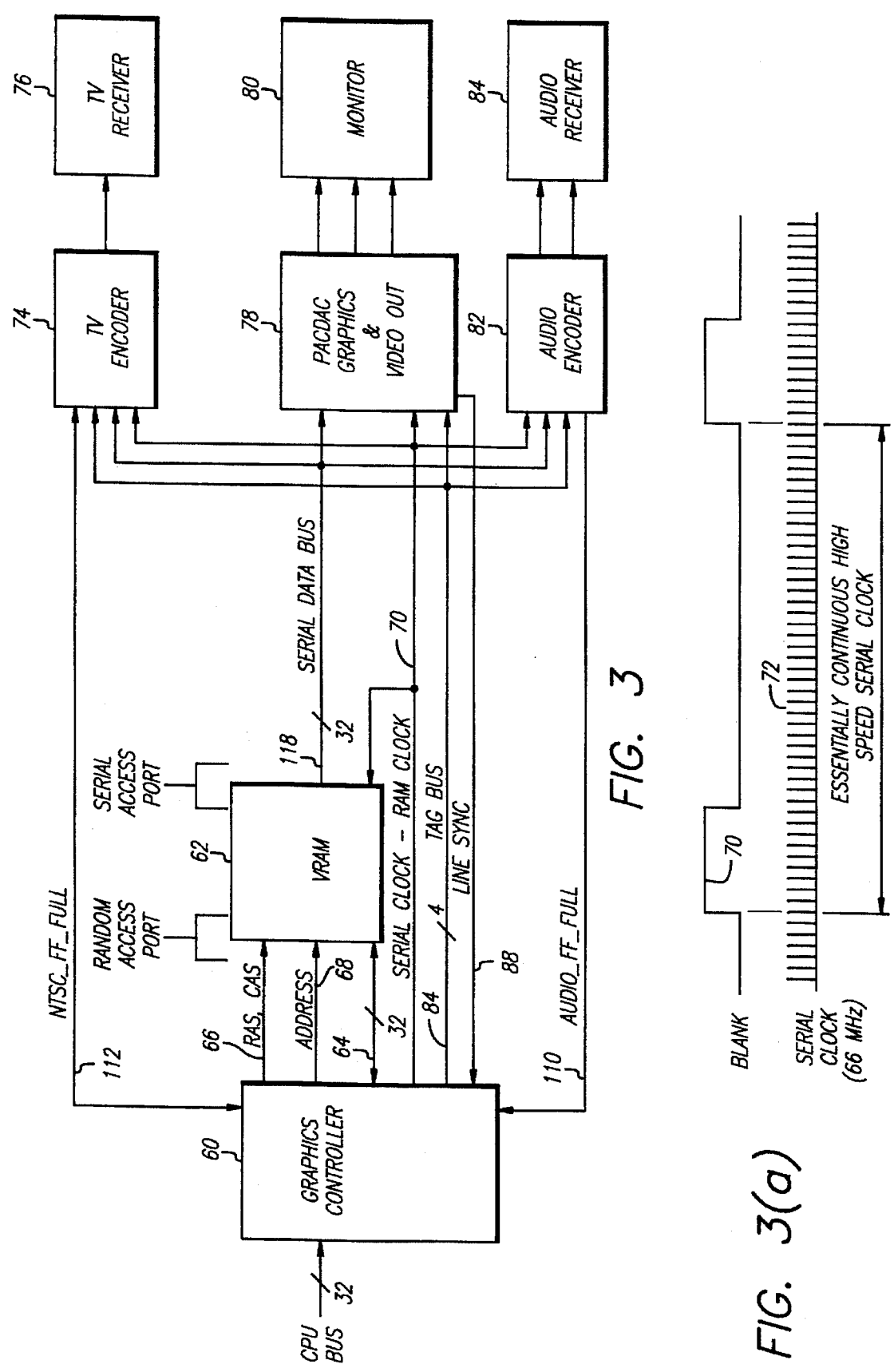

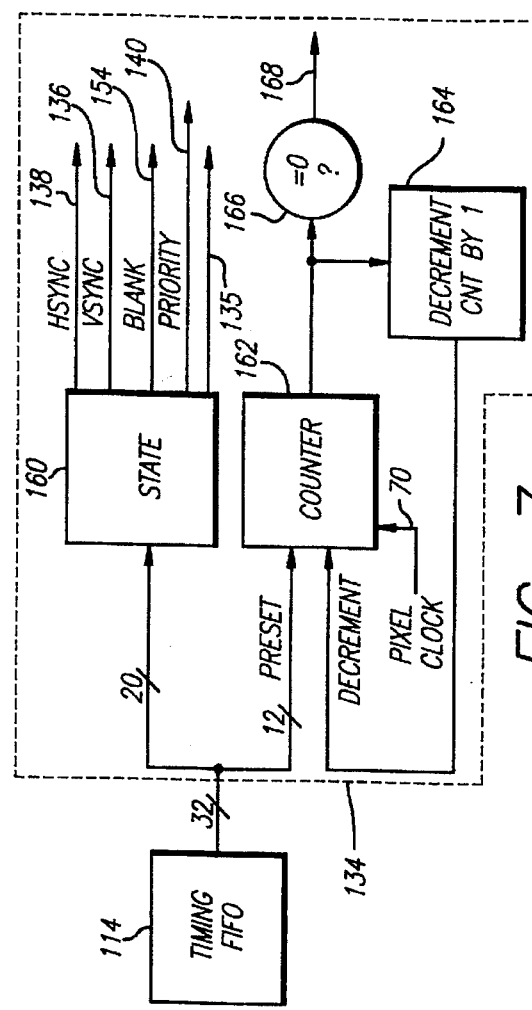
FIG. 4
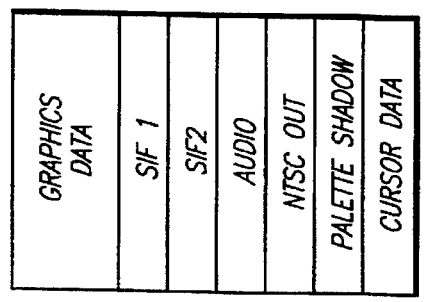
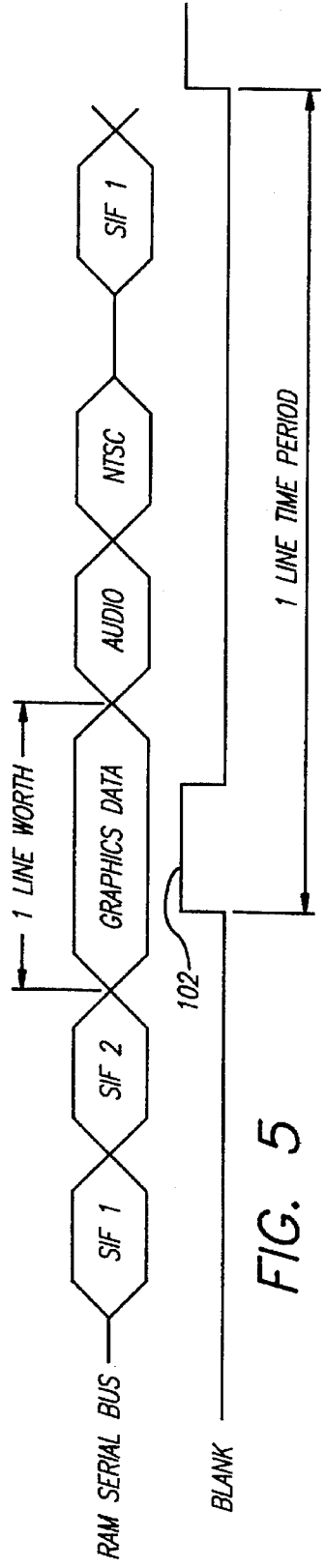
FIG. 5
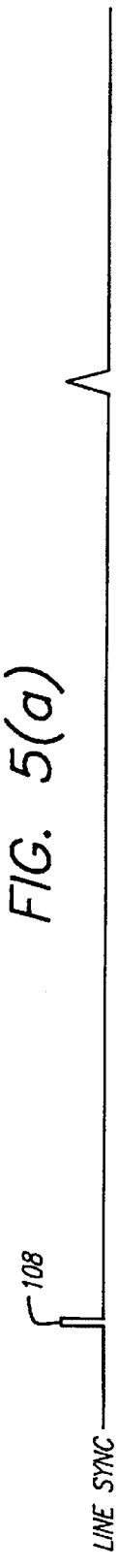
FIG. 7
FIG. 5(a)

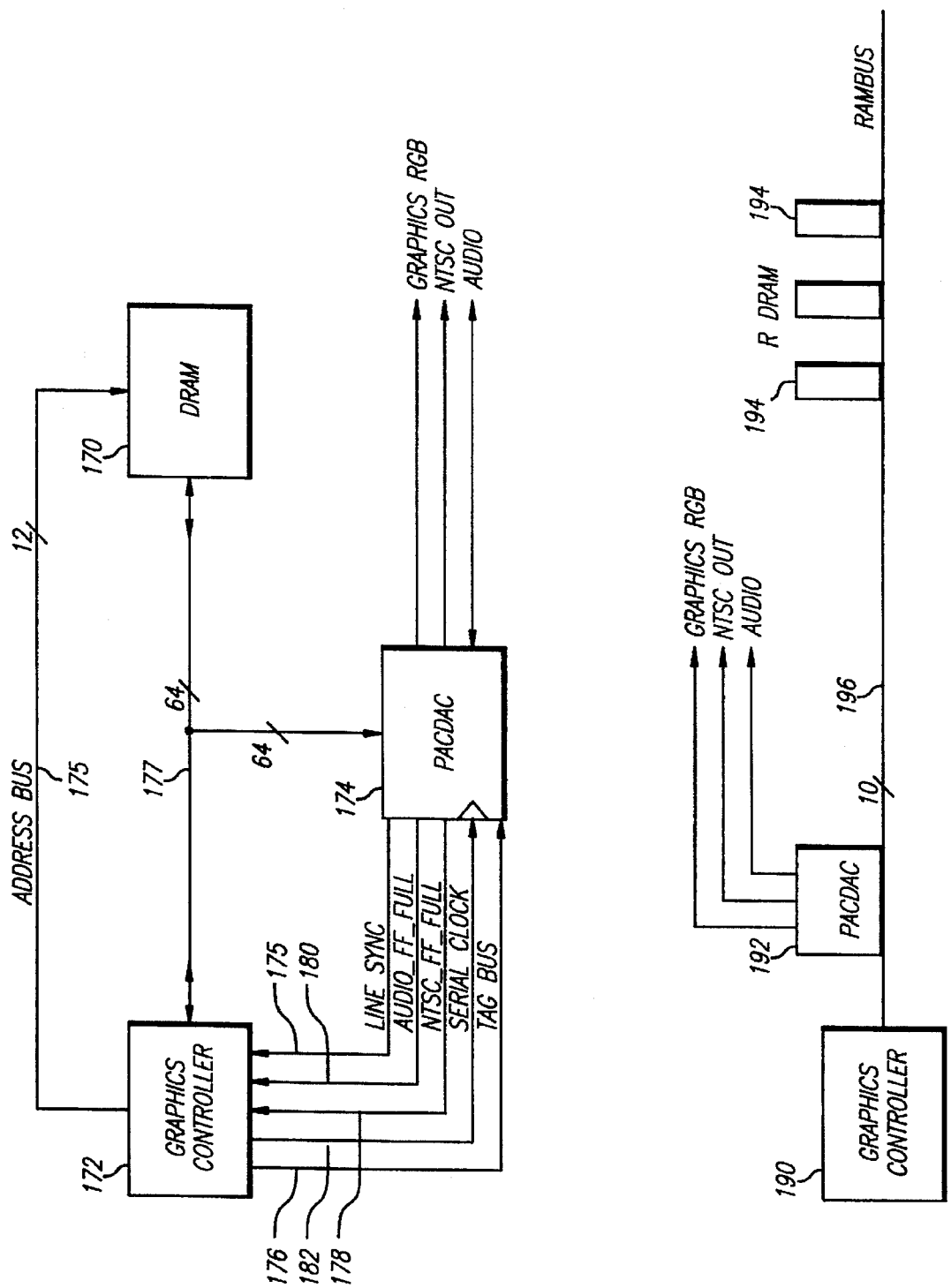

MULTIMEDIA GRAPHICS SYSTEM

This is a continuation of application Ser. No. 08/214,787 filed Mar. 16, 1994, abandoned.

This invention relates to apparatus for and methods of, processing digital information and more particularly relates to apparatus for, and methods of, processing different types of information in a multimedia environment. The invention especially relates to the selective processing of different types of information (including standard interframe video information, graphics information, television information and audio information) in an efficient and reliable manner.

BACKGROUND OF THE INVENTION

Significant advances have been made in recent years in providing displays of a video information on a video monitor or screen. For example, graphics information has been displayed on a video monitor with enhanced resolution and fidelity as a result of significant advances in the processing of the digital information representing such colors and in the conversion of such digital information into an analog form. Such information has often been processed in digital form and thereafter converted to analog form in a personal computer or work station. In recent years, video information has been simultaneously displayed with the graphics information in such personal computers and work stations. For example, video information has been displayed in a window on the face of the video monitor of the personal computer or work station while graphics information has been displayed on the remainder of the monitor face.

In recent years there have also been significant strides in using miniaturized computers such as personal computers and work stations in processing information involving multimedia applications. These multimedia applications may take many different forms. For example, they may involve graphics, television, facsimile and/or audio. In spite of these advances, a suitable system does not exist which is sufficiently flexible to process different types of information efficiently, inexpensively and reliably. For example, the systems now in use are not capable of switching efficiently, inexpensively and reliably between different types of presentations such as graphics, video and audio. This has been particularly true when information from more than one type of media (e.g. graphics, video, television and audio) is to be presented simultaneously. This has limited the utility of the systems now in use. Such limitations exist now in multimedia equipment even though considerable amounts of money have been expended, and considerable effort has been devoted, through the years, and particularly in recent years, to develop a satisfactory multimedia system.

BRIEF DESCRIPTION OF THE INVENTION

In one embodiment of this invention, words of different types of digital information including standard interframe video (SIF), graphics, television and audio are transferred preferably in packets between a controller, a storage memory and shift registers (e.g. FIFO's) individually associated with the different information types. For a VRAM memory, information is transferred in parallel, controlled by tag bus information, from the controller to the memory and then serially from the memory to the FIFO's, all at a frequency higher than a clock frequency in a monitor raster scan.

The tag bus information is decoded and introduced to an additional FIFO. A state machine processes such additional FIFO information and transfers the digital information to the different FIFO's at times controlled in each line by such additional FIFO—e.g. particular times in each line for the SIF and the graphics and thereafter, for television and audio, at times unrelated to any times in such line.

The graphics transfer is timed to substantially fill, but not overflow, the limited capacity of the associated FIFO in each line. Their limited capacities cause the television and audio FIFO's to stop receiving words when filled to particular limits. For a DRAM memory, information is transferred, dependent upon tag bus information, in parallel between the controller, memory and FIFO's at the clock frequency. In a "Rambus" system, a bus common with the controller, memory and FIFO's provides control and timing words. The information in successive words is transferred through the common bus to the controller, memory and FIFO's dependent upon such timing and control information in such words.

BRIEF DESCRIPTION OF THE DRAWINGS

In the drawings:

FIG. 3 is a schematic block diagram of a system constituting one embodiment of the invention;

FIG. 3(a) shows waveforms at strategic terminals in the system shown in FIG. 3;

FIG. 4 is a table illustrating the different types of digital information processed by the system shown in FIG. 3;

FIG. 5 illustrates the sequence of signals processed by the system of FIG. 3 in each line in a raster scan in a monitor included in FIG. 3;

FIG. 5(a) illustrates wave forms at strategic terminals in the system of FIG. 3;

FIG. 7 is an expanded schematic block diagram illustrating one of the blocks in FIG. 6 in additional detail;

FIG. 8 is a schematic block diagram of another embodiment of the invention;

FIG. 9 is a schematic block diagram of a further embodiment of the invention.

DETAILED DESCRIPTION OF THE INVENTION

Figure 1:
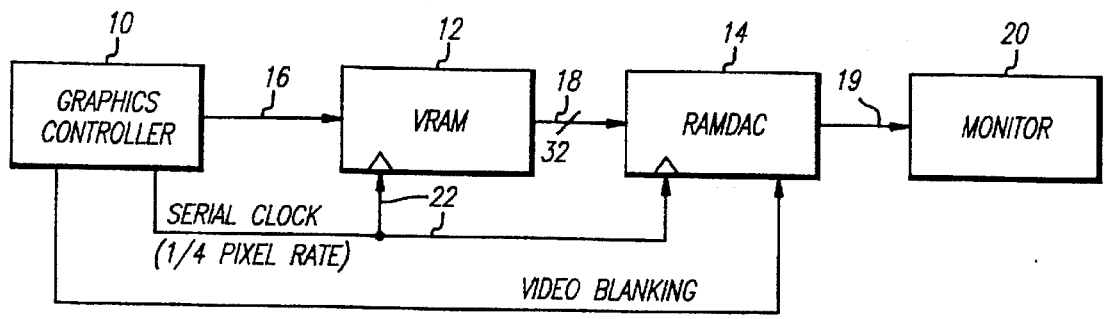
FIG. 1 is a schematic block diagram of a system of the prior art.

FIG. 1 illustrates an embodiment of the prior art. The embodiment includes a graphics controller 10, a storage memory such as a VRAM 12 and stages 14 comprising a random access memory (RAM) and a digital-to-analog converter (DAC). The graphics controller 10 may be a central processing unit which transfers information into the VRAM 12 as indicated at 16. Information is in turn transferred from the VRAM 12 into the stages 14 (designated as "RAMDAC" in FIG. 1 as an acronym for random access memory and digital-to-analog converter). The random access memory may comprise a palette (also known as a look-up table) which is well known in the art. The transfer of information into the RAMDAC 14 is indicated at 18. A "/32" indication is provided adjacent the line 18 to indicate that there may be thirty two (32) bits in each word of information. The analog output from the RAMDAC is indicated at 19. This output may be introduced to a monitor 20 for display on the face of a display screen in the monitor.

The palette in the RAMDAC may have a plurality of positions each indicating an individual color. The color at each position may be indicated by a first plurality of bits indicating the primary color red, a second plurality of bits indicating the primary color blue and a third plurality of colors indicating the primary color green. When an individual position in the palette is selected, the bits indicating each of the primary colors are converted to corresponding analog values in the RAMDAC. The respective intensities of the three primary colors at each pixel position controls the color generated at such pixel position on the face of the monitor 20.

The graphics controller 10 introduces binary indications into successive positions in the VRAM 12. Each of these binary indications is comprised of a plurality of binary bits. Each plurality indicates a particular position to be selected in the palette. The information transferred from the graphics controller 10 to the VRAM 12 and from the VRAM to the RAMDAC 16 may be provided at a particular clock frequency as indicated by a line 22 extending from the graphics controller 10 to the VRAM 12 and the RAMDAC 14.

Graphics information may be displayed on the screen of the monitor 20. When the RAMDAC 14 is included in a work station (not shown), the image on the face of the monitor 20 may be formed by a plurality of pixels in a raster scan. For example, twelve hundred and eighty (1280) pixels may be provided in each horizontal line in the raster scan and ten hundred and twenty four (1024) lines may be provided in such raster scan. The raster may be refreshed at a rate of seventy hertz (70 Hz). Under such circumstances, the pixels are presented at a frequency of one hundred and thirty two megahertz (132 Mhz). When the VRAM provides words thirty two (32) bits wide, four (4) bytes each of eight (8) bits may be presented in parallel. This allows the information to be transferred serially from the VRAM at a frequency of thirty three megahertz (33 Mhz). Since each byte comprises eight (8) bits, the palette may have two hundred and fifty six (256) different positions each indicating an individual color.

Figure 1A:
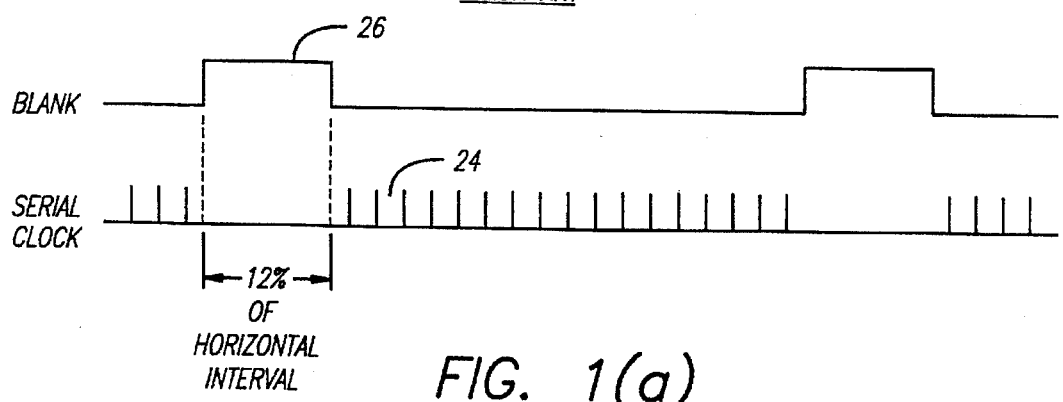
FIG. 1(a) shows wave forms at strategic terminals in the system shown in FIG. 1.

It may be desired to update the palette in the RAMDAC 14. This may be accomplished during the horizontal retrace period at the end of each line or during the horizontal blanking interval at the beginning of each line. The horizontal retrace period is relatively short but the horizontal blanking interval in each line is approximately twelve percent (12%) of the duration of the line. The palette may also be updated during the vertical retrace period at the end of each raster scan. The vertical retrace period is considerably longer than each horizontal retrace period. FIG. 1(a) schematically indicates the clock signals on the line 22 as at 24 and schematically indicates the blanking interval 26 at the beginning of each line.

The system shown schematically in FIG. 1 and discussed above has had extensive usage in the prior art. It is advantageous in that it is relatively simple and reliable. It is disadvantageous in that it provides only a limited number of pseudo colors rather than real colors. Furthermore, it is able to provide only graphics information for display on the monitor 20. It is also not capable of fully utilizing the advantages offered by the latest models of VRAMS which are just being introduced to the market. These VRAMS are capable of operating at a frequency of sixty six megahertz (66 Mhz). This is in contrast to the maximum frequency response of thirty three megahertz (33 Mhz) for the VRAMs now on the market.

Figure 2:
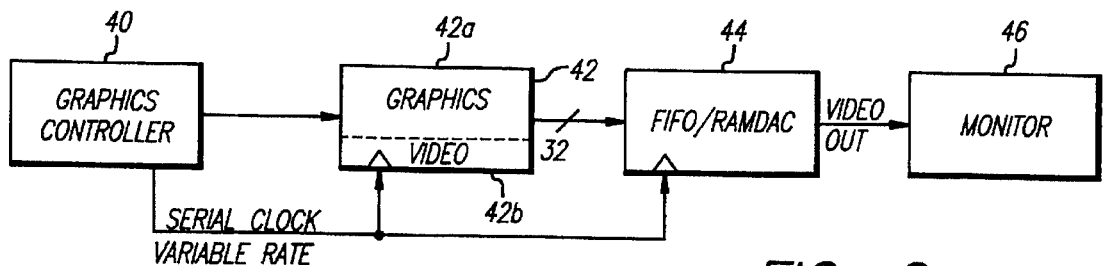
FIG. 2 is a schematic block diagram of another system of the prior art, this system being shown and disclosed in a patent application recently filed in the Patent Office by the assignee of record in this application.

FIG. 2 schematically shows a system which is disclosed and claimed in application Ser. No. 08/014,359 (now U.S. Pat. No. 5,406,306); (file D-2657) filed by Jonathan I. Siann, Conrad M. Coffey and Jeffrey L. Easley on Feb. 5, 1993, for a "System For, and Method of, Displaying Information from a Graphics Memory and a Video Memory on a Display Monitor" and assigned of record to the assignee of record of this application. A graphics controller 40, a storage member (such as a VRAM 42) and stages 44 are included in the system. The stages 44 may include a shift register such as a first-in-first-out (FIFO) register and may also include a random access memory (RAM) and a digital-to-analog converter (DAC).

Information is introduced into the VRAM 42 from the graphics controller 40 in the embodiment shown in FIG. 2. This information may be graphics information in a first portion 42a of the VRAM and may also be standard interframe video in information (SIF) such as NTSC or PAL video in a second portion 42b of the VRAM. The first and second portions of the VRAM 42 are indicated schematically by a broken horizontal line in the VRAM. The SIF information may illustratively have 320 pixels per horizontal line and may have 240 horizontal lines in each raster scan.

The graphics information for a frame may be stored in one portion of the VRAM 42 as indicated at 42a and the standard interframe video information for a frame may be stored in a second portion 42b of the VRAM. This is advantageous over the prior art because it eliminates the need for a separate storage memory to store the standard interframe video information. The graphics information and the standard interframe video information are transferred from the graphics controller 40 into the VRAM 42 in parallel form. Each word of parallel information may have thirty two (32) bits.

Figure 2A:
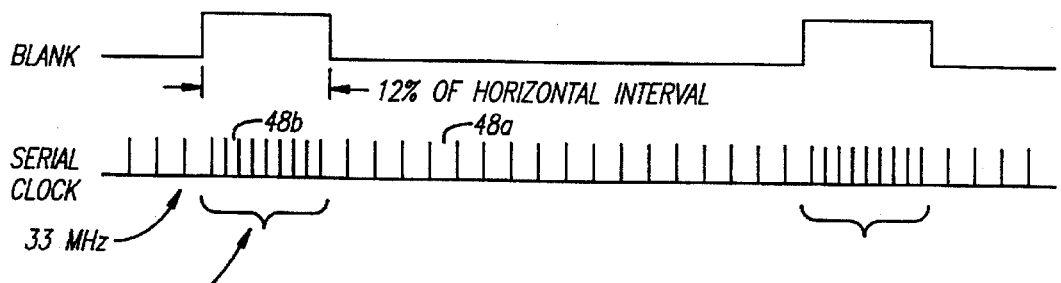
FIG. 2(a) shows wave forms at strategic terminals in the system shown in FIG. 2.

The graphics information and the standard interframe video information are serially transferred from the VRAM 42. The graphics information in the portion 42a of the VRAM 42 is transferred, as in the embodiment shown in FIG. 1, at a rate of thirty three megahertz (33 Mhz) by providing four (4) bytes, each of eight (8) bits. The transfer is made into the RAMDAC portion of the stages 42 in a manner similar to that disclosed above for the embodiment shown in FIG. 1. This transfer occurs during the portion of each line in the raster scan in a monitor 46 other than the video blanking interval. This transfer is in synchronism with the rate of presentation of pixels on the screen of the video monitor 46. The transfer is accordingly at thirty three megahertz (33 Mhz). This transfer is indicated at 48a in FIG. 2a.

However, as previously indicated, the VRAMs now being introduced into the market can transfer information serially out of the VRAM 42 at a rate of sixty six megahertz (66 Mhz). The transfer accordingly does not utilize the full capability of the VRAM 42. During the horizontal retrace and the horizontal blanking interval in each line in the raster scan in the monitor 46, the standard video information (SIF) is transferred serially from the portion 42b of the VRAM 42 into the FIFO portion of the stages 44 at a frequency of sixty six megahertz (66 Mhz). This transfer is indicated at 48b in FIG. 2a.

The horizontal blanking interval constitutes only about twelve percent (12%) of the time in a line. However, since there are only three hundred and twenty (320) pixels in a line in standard interframe video information, the horizontal retrace period and the horizontal blanking interval are sufficiently long to transfer all of the standard interframe video information for a line into the FIFO portion of the stages 44. This is particularly true if the information transfer is at a rate of sixty six megahertz (66 Mhz). The information stored in the FIFO portion of the stages 44 for each line is converted into a line of twelve hundred and eighty (1280) pixels in the stages 44 by techniques known in the prior art. A multiplexer included in the stages 44 (but not specifically shown) then selects, in accordance with information from the controller 40, whether the graphics information in the RAM or the standard interframe information obtained from the FIFO will be converted by the DAC to analog information for display on the screen of the monitor 46. The video information in the portion 42b of the VRAM is transferred into the stages 44 at the graphics frequency of thirty three megahertz (33 Mhz).

The system shown in FIG. 2 and described above has certain important advantages. As described above, it uses only one (1) VRAM to store two (2) types (graphics and standard interframe video) information. It provides for the transfer of both types of information in each line in the raster scan and provides for the display of both types of information simultaneously in the successive frames on the screen of the monitor 46. For example, the graphics information may be displayed in the major portion of the raster scan and the standard interframe video information may be displayed in a window in the raster scan. However, the full transfer capabilities of the VRAM at sixty six megahertz (66 Mhz) are utilized for only a small (12%) portion of each line. Furthermore, only two (2) types of information can be presented. This is less than the number of different types of information that it is often desired to provide in a multimedia system.

FIG. 3 is a schematic diagram illustrating one embodiment of the invention. This embodiment includes a graphics controller 60 similar to that shown in FIGS. 1 and 2. Words of digital information are transferred from the graphics controller 60 to a storage member such as a VRAM 62 similar to that shown in FIGS. 1 and 2. Each word may be thirty two (32) bits wide and may be provided through a bus 64. Each word is transferred to a particular location in the VRAM 62 under the control of address information passing to the VRAM 62 through a pair of lines 66 and 68. A row address select (RAS) may be provided on the line 66 and a column address select (CAS) may be provided on the line 66. The digital information passing through the lines 64, 66 and 68 may be at the VRAM clock frequency of sixty six megahertz (66 Mhz). These clock signals are provided through a line 70.

The digital information in the VRAM 62 is transferred from the VRAM serially word by word at the clock frequency of sixty six megahertz (66 Mhz). Unlike the embodiment shown in FIG. 2 in which this high clock rate was possible only during the blanking interval in each horizontal line in the raster scan, the high clock rate is essentially continuous in the embodiment shown in FIG. 3. The only time that the clock is not at sixty six megahertz (66 Mhz) is when a serial register transfer is being made inside the VRAM at the request of the graphics controller 60. During this time, new data is being transferred from the storage location in the VRAM register to the VRAM serial data register in the VRAM 62. This occurs for only a few cycles of the clock frequency in each line in the raster scan.

The blanking interval in each line in the raster scan is indicated at 70 in FIG. 3(a). The serial transfer of data from the VRAM 62 at essentially the clock frequency of sixty six megahertz (66 Mhz) is digital and is indicated at 72 in FIG. 3(a). The information transferred serially from the VRAM 72 at this clock frequency may represent a number of different media. For example, the information may include television information in NTSC, PAL or SECAM form. This information is transferred to a television encoder 74 in FIG. 3 and is then transferred from the television encoder to a television receiver 76.

The digital information may also be transferred from the VRAM 62 to stages 78. This information may have several different forms. It may constitute standard interframe video information (SIF). Actually, the standard interframe video information may have several different forms. For example, SIF information may have 240 lines each of 320 pixels in a raster scan (designated as SIF1). Similarly, information designated as SIF2 may have 120 lines and 160 pixels in each line.

The digital information transferred from the VRAM 62 may also be in graphics form. The graphics information may have several different formats. For example, when the graphics information is intended for a workstation, there may be 1024 rows and 1280 pixels in each row. When the graphics information is intended for a VGA format, there may be 4xx rows and 6xx pixels in each row. For a super VGA format, the number of rows may be 768 and the number of pixels in each row may be 1024. The stages 78 may receive other types of information in addition to the standard interframe video information and the graphics information. For example, digital information may be transferred from the VRAM 62 to the stages 78 to indicate cursor information.

The information transferred to the stages 78 is introduced to a monitor 80 corresponding to the monitors 20 and 46 respectively shown in FIGS. 1 and 2. Audio information may also be transferred to an audio encoder 82 for storage and conversion to analog form and may then be transferred from these stages to an audio receiver 84. As will be appreciated and as will be seen from subsequent Figures, the stages 78 are shown in simplified form as a single stage but may actually constitute a plurality of different stages.

Some control may accordingly have to be provided to direct the information from the VRAM 62 at different times to individual ones of the television encoder 74, the stages 78 (including standard interframe video, graphics and cursor encoders) and the audio encoder 82. This control is provided by a tag bus 86 which may provide four (4) bits in parallel. In the embodiment shown in FIG. 3, the tag bus 86 provides these four (4) bits for each word or packet of thirty two (32) bits from the VRAM 62. The four (4) bits are encoded to direct such word or packet into the proper one of the different encoders including the stages 78. A line 88 also extends in FIG. 3 from the stages 78 to the graphics controller 60 to synchronize the operation of the graphics controller in each line in the raster scan in providing for the passage of information serially from the VRAM 62 to the different encoders including the stages 78.

Figure 6:
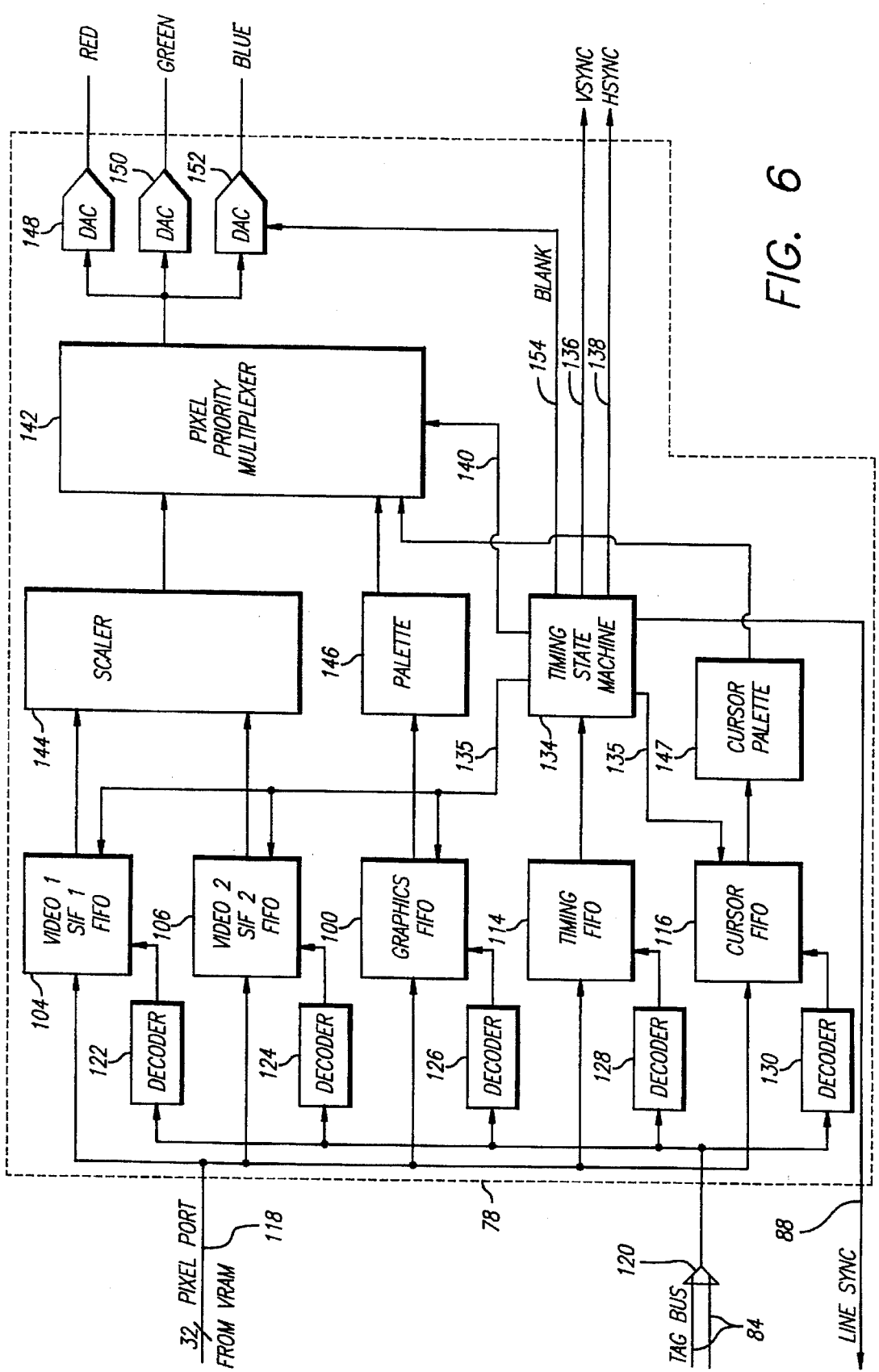
FIG. 6 is an expanded schematic block diagram illustrating one of the blocks in FIG. 3 in additional detail.

As illustrated in FIG. 4 and as discussed above, different types of digital information may be transferred from the VRAM 62 to the different types of encoders shown schematically in FIG. 3 and in additional detail in FIG. 6. Such different types of digital information may include graphics, different types of standard interframe video (such as those designated as SIF1 and SIF2), audio, television (designated as NTSC only by way of illustration) and cursor.

The information transferred from the VRAM 62 may also include what is designated in FIG. 4 as a palette shadow. This information involves an updating of every position in the palette or look-up table at the end of each frame in the raster scan in the monitor 80 in FIG. 3. The updating is provided in each position in the palette even though the color information in some positions in the palette remains unchanged. This is different from the updating provided in the prior art. In the prior art, the updating is generally provided at the end of each line and is only in selected positions. The updating of all of the positions in the palette at the end of each frame in the raster scan may be provided because the updating is occurring at the high frequency of sixty six (66) megahertz.

The transfer of information from the VRAM 62 may occur in a particular sequence in each line in the raster scan in the monitor 80. This sequence is illustratively shown in FIG. 5. The sequence in each line may be as follows: standard interframe video information (SIFI and SIF2), graphics information, audio information and television information (designated as NTSC). The right end of FIG. 5 shows the beginnig of another sequence. The standard interframe video information and the graphics information may be synchronized at a particular time relative to each line. The audio information and the television (NTSC) information may occur after the standard interframe video information and the graphics information in each line but at a time unrelated to any synchronizing information, such as the blanking interval, in such line. It will be appreciated that, although NTSC information is specifically designated in FIG. 5, other types of television information such as PAL or SECAM are within the scope of the invention.

FIG. 5 illustrates the sequence of the different types of digital information in each line. As will be seen, the standard interframe video information (SIF1 and SIF2) occurs first in each line. This is followed by the graphics information. The audio and television (e.g. NTSC) information then occur in each line. For the line in each raster scan where the cursor appears, the cursor information occurs after the television (e.g. NTSC) information. During the vertical retrace interval in each raster scan, the palette shadow information is provided to update the palette or look-up table for the graphics information in the next raster scan.

As shown in FIG. 6, the graphics data is transferred into a shift register such as a first-in-first out register 100 (e.g. FIFO) in FIG. 6. The FIFO 100 and other FIFO's in the embodiment shown in FIG. 6 and in other Figures in this application are well known in the art. They receive and store words of information. These words of information are shifted through the FIFO 100 (and other FIFO's) in the same order as they are received. When the information introduced into the FIFO 100 has been shifted through the FIFO, the words of digital information are then transferred from the FIFO in the same order as they are received.

The FIFO 100 for the graphics information has a capacity less than the number of pixels in each line. This causes the transfer of the bytes of binary graphics information into the FIFO 100 to be initiated at a particular instant in each line in the raster scan. This initiation of the transfer of the digital graphics information in each line into the FIFO 100 occurs at a particular time during the blanking interval 102 (see FIG. 5) in each line. By initiating the transfer of the digital graphics information into the FIFO 100 at such time, substantially the full capacity of the FIFO 100 can be utilized in receiving the bytes of graphics information for the line without any of the graphics information being unable to be transferred into the FIFO because the FIFO has become filled. Furthermore, with this type of transfer, substantially the full capacity of the FIFO is used all of the time.

The standard interframe video information is transferred into storage registers such as FIFO's 104 (for the SIF1) and 106 (for the SIF2) in FIG. 6. The transfer of the standard interframe video information into the FIFO's 104 and 106 for each line may be initiated at a time 108 in FIG. 5a before the blanking interval for the line. The FIFO's 104 and 106 may have a full capacity (rather than a partial capacity as for the FIFO 100) because the capacities of the FIFO's 104 and 106 are not very large. This results from the fact that there are only 320 pixels per line in the SIF1 information and only 160 pixels per line in the SIF2 information. This is in contrast to 1280 pixels per line in the graphics information for display on the monitors in work stations.

As will be seen from FIG. 5a and from the discussion above, the transfers of the standard interframe video information and the graphics information may be initiated at particular times in each line in the raster scan in the monitor 80 in FIG. 3. The transfer of the audio information for each line in the raster scan into the audio encoder 82 in FIG. 3 may be initiated immediately after the transfer of the graphics information for that line has been completed. However, the transfer of the audio information may be initiated without reference to any particular time in each line. The capacity of the audio encoder 82 (which may be a FIFO) is somewhat limited. Because of this, when the audio encoder 82 has been substantially filled in a line, it sends a signal (designated as "Audio FF Full") on a line 110 in FIG. 3 to the graphics controller 60. This signal causes the graphics controller 60 to instruct the VRAM 62 to stop sending words of digital audio information to the audio encoder 82 for that line.

In like manner, the transfer of the words of the digital television information may be initiated in each line after the transfer of the audio information in that line. The transfer of such words of digital television information in each line is made into the encoder 74 in FIG. 3. As with the audio information, the transfer may be made on an asynchronous basis in each line, in other words, without reference to any particular time in such line. The capacity of the encoder 74 may be somewhat limited. Because of this, the encoder 74 sends a signal through a line 112 in FIG. 3 to have the graphics controller 60 discontinue the transfer of television information into the encoder from the VRAM 62 in any line when the encoder has been filled to a particular capacity in that line. This signal is designated in FIG. 3 as "NTSC-FF-FULL".

The stages 78 in FIG. 3 are shown in additional detail in FIG. 6. This is indicated by broken lines which extend around the stages shown in FIG. 6 and which have the numerical designation 78. As previously described, the stages 78 in FIG. 3 may include the FIFO'S 100, 104 and 106 in FIG. 6. They may also include FIFO's 114 and 116 in FIG. 6. The FIFO 116 receives the cursor information in a particular line in the raster scan. The stages 100, 104, 106 and 116 may receive words of digital information through a bus 118 (also shown in FIG. 3) from the VRAM 62. In contrast, the FIFO 114 may receive the timing and control information through a decoder 128 from the tag bus 84 also shown in FIG. 3.

The information from the tag bus 84 may pass through an amplifier 120 in FIG. 6 to decoders 122, 124, 126, 128 and 130 respectively for the FIFO's 104, 106, 100, 114 and 116. Decoders such as the decoders 122, 124, 126, 128 and 130 are well known in the art. They decode the four (4) bits of digital information in the tag bus 84 for each word of digital information in the bus 118. The decoded information controls which one of the FIFO's 100, 104, 106 and 116 will receive and store that word of information. Furthermore, the decoder 128 decodes the words of the digital information in the tag bus 84 to provide timing and control information in binary form. This timing and control information passes from the decoder 128 into the FIFO 114.

The information in the FIFO 114 then passes into a timing state machine 134 which processes this information to produce various timing and control signals for each line in the raster scan. For example, the timing state machine 134 may produce the synchronizing signal on the line 88 to initiate the transfer of the standard interframe video information in each line into the FIFO's 104 and 106 at the time indicated at 108 in FIG. 5(a). The timing state machine 134 may also produce on a line 138 the horizontal sync signal for each line in the raster scan and on a line 136 the vertical sync signal after each such raster scan. The timing state machine may also produce the horizontal blanking signal (see 70 in FIG. 3a and 102 in FIG. 5) on a line 154 in FIG. 6.

The timing state machine 134 may also produce signals on a line 135 for introduction to the FIFO's 100, 104, 106 and 116. These signals may activate individual ones of the FIFO's 100, 104, 106 and 116 to provide for the passage of signals from these FIFO's at times determined by the timing state machine. The signals from the standard interframe video FIFO's 104 and 106 pass to a scaler 144; the signals from the graphics FIFO pass to a palette 146; and the signals from the cursor FIFO 116 pass to a cursor palette 147.

The timing state machine 134 may additionally produce a priority signal on a line or bus 140. This signal is introduced to a pixel priority multiplexer 142 to control whether the standard interframe video information from one of the FIFO's 104 and 106 or the graphics information from the FIFO 100 will pass through the multiplexer at each instant. The information in the FIFO's 104 and 106 may be initially introduced to the scaler 144 and the scaled information may be then passed to the multiplexer 142. The scaler 144 is well known in the art and different examples of the scaler 144 are disclosed in some detail in co-pending application Ser. No. 08/014,359 (attorneys file D-2657). The scaler increases the number of bytes in the FIFO's 104 and 106 for each line in the raster scan into a number of bytes corresponding to the number of bytes in each line in the graphics information.

The bytes of the digital information in the FIFO 100 for each line may be introduced to the palette 146 to select the individual positions in the palette for the passage of color information to the pixel priority multiplexer 142. The palette 146 corresponds in construction to the palette in the RAM-DAC 14 in FIG. 1 and to the palette in the stages 44 in FIG. 2. In like manner, the FIFO 116 passes information to the cursor palette 147 which passes the cursor information to the multiplexer 142 for passage through the multiplexer. The passage of the cursor information from the palette 147 through the multiplexer 142 may be controlled by the priority signal on the line 140.

The bytes of information passing through the multiplexer 142 from the scaler 144, the palette 146 and the palette 147 may be introduced to digital-to-analog converters 148, 150 and 152 respectively for the primary colors red, green and blue. The analog signals from the converters 148, 150 and 152 then pass to the monitor 80 shown in FIG. 3. The converters 148, 150 and 152 may receive a blanking signal on the line 154 from the timing state machine 134. The blanking signal blanks the converters 148, 150 and 152 before the beginning of each line in the raster scan.

The timing state machine 134 is shown in additional detail in FIG. 7 as being included within broken lines designated as 134. As shown in FIG. 7, each byte of information from the timing FIFO 114 may comprise thirty two (32) bits. Of these, twenty (20) bits may be introduced to stages 160 (designated as "state") which produce the horizontal sync signal on the line 138, the vertical sync signal on the line 136, the blanking signal on the line 154, the priority signal on the line 140 and the signals on the lines 135 to the FIFO's 100, 104, 106 and 116 in FIG. 6. The timing of these signals is provided by the other twelve (12) bits in each word from the timing FIFO 114. These bits are introduced to a counter 162 which is preset to a particular value.

The counter 162 then counts downwardly by an integer through a decrementing stage 164 every time that a pixel clock signal is produced on the line 70 (also shown in FIG. 3). When the counter 162 reaches a count of zero (0), the count from the counter corresponds to a count preset in a comparator 166. The comparator 166 then produces a signal on a line 168 to provide for the passage of the next word of thirty two (32) bits from the FIFO 114 to the stages 160 and the counter 162.

FIG. 8 schematically illustrates an embodiment in which a dynamic random access memory (DRAM) 170 may be used instead of a VRAM as in the previous embodiment. The DRAM 170 is advantageous because the cost of a DRAM is approximately one half (½) of the cost of a VRAM of the same size. The embodiment shown in FIG. 8 is also advantageous because all of the transfer of information, even from the DRAM 170, to PACDAC stages 174 is in parallel. This tends to increase the speed of operation of the system shown in FIG. 8.

However, a DRAM is disadvantageous in comparison to a VRAM because first information cannot be simultaneously introduced into a DRAM while second information is being transferred out of the DRAM. Furthermore, the data bandwidth of the system shown in FIG. 8 is not as great as that of FIG. 3 because only the random access port of the DRAM 170 is used and the bandwidth of the DRAM is typically less than half of the sixty six megahertz (66 Mhz) bandwidth in the VRAMs which are being introduced into the market.

The embodiment shown in FIG. 8 includes a graphics controller 172 similar to the graphics controller 60 shown in FIG. 3. It also includes stages 174 designated as "PAC-DAC". These stages correspond to the stages 78 shown in FIG. 3. One difference between the system shown in FIG. 8 and the system shown in FIG. 3 is that, in the system shown in FIG. 8, each of the controller 172, the DRAM 170 and the PACDAC stages 174 can communicate with the others. The transfer of information into the DRAM 170 from the controller 172 and out of the DRAM 172 is controlled by address signals on a bus 175. The signals on the bus 175 correspond to the signals on the lines 66 and 68 in FIG. 3.

As in the embodiment shown in FIG. 3, a tag bus 176 is provided in FIG. 8 to control the destination of the bytes of the different types of information in the DRAM 170 and the time in each line for the transfer of such bytes. As in the embodiment shown in FIG. 3, the PACDAC stages 174 can have the construction shown in FIG. 6 and the timing state machine in the PACDAC stages 174 can have the construction shown in FIG. 7. The different types of information can be provided in the sequence shown in FIG. 5 and the timing for the standard interframe video information in each line can be provided as by a pulse on a line 175 corresponding to the pulse 108 in FIG. 5.

As shown in FIG. 8, the words of digital information transferred between the DRAM 170, the graphics controller 172 and the PACDAC stages 174 on a bus 177 may have sixty four (64) bits. The DRAM 170 may accordingly be formed from four (4) DRAMs in parallel, each DRAM having sixteen (16) bits. As in the embodiment shown in FIG. 3, the FIFO for the graphics information may have a limited capacity to conserve cost and space. The FIFO's for the television (e.g. NTSC) and audio information may also have limited capacities as in the embodiment shown in FIG. 3. This is indicated by the designation of "NTSC-FF-FULL" for a line 178 and "AUDIO-FF-FULL" for a line 180. Signals may accordingly be produced respectively on the lines 178 and 180 to instruct the graphics controller 172 to interrupt the transfer of information from the DRAM 170 into the television and audio FIFO's when these FIFO's become filled to a particular limit. Clock signals may be produced on a line 182 in the embodiment shown in FIG. 8 in a manner similar to the production of clock signals on the line 70 in the embodiment shown in FIG. 3.

The embodiment shown in FIG. 9 is intended to be used for a system designated as "RAMBUS." The "RAMBUS" system is well known in the prior art. For example, International application PCT/US91/02590 was published on Oct. 31, 1991. The embodiment shown in FIG. 9 represents an improvement in the "RAMBUS" system of the prior art. The system shown in FIG. 9 includes a graphics controller 190, PACDAC stages 192 and DRAMs 194 as in the embodiments shown in FIGS. 3 and 8. However, unlike the embodiments shown in FIGS. 3 and 8, the controller 190, the stages 192 and the DRAMs 194 may be connected by a common bus 196. Packets or words of digital information may pass through the bus 196 between the controller 190, the PACDAC stages 192 and the DRAMs 194. Each of these words or packets may have ten (10) bits.

Eight (8) of the ten (10) bits in each word or packet in the embodiment of FIG. 9 may comprise data. The other two (2) bits in each word or packet may be used to provide parity checking and to provide special signalling. The two (2) bits for special signalling in individual ones of the words or packets may be used to indicate that the eight (8) data bits in such words or packets provide the information provided in the Tag Bus in the embodiments shown in FIGS. 3 and 8. For example, such eight (8) bits specify the destination of the data in the subsequent words or packets and specify the timing for the information in the subsequent words or packets.

The graphics controller 190 in FIG. 9 may have the same construction as the graphics controller in the embodiments shown in FIGS. 3 and 8. The DRAMs 194 in the embodiment of FIG. 9 may have the same construction as the DRAM 170 in the embodiment shown in FIG. 8. However, the DRAMs 194 may be only ten (10) bits wide rather than sixty four (64) bits wide as in the embodiment shown in FIG. 8. The PACDAC stages 192 shown in FIG. 9 are substantially the same as the PACDAC stages shown in block form in FIG. 3 and in detail in FIG. 6 except that, as described above, a Tag Bus is not included in the embodiment shown in FIG. 9. Because of this, the PACDAC stages 192 in FIG. 9 may have the construction shown in FIG. 10. They are included within broken lines designated as 192 in FIG. 10. In the PACDAC stages shown in FIG. 10, different stages have the same numerical designation as the stages shown in FIG. 6 except that they are preceded by the numeral "2" rather than the numeral "1" as in the embodiment shown in FIG. 6. For example, the graphics FIFO is designated as "200" in FIG. 10 but is designated as "100" in FIG. 6.

Figure 10:
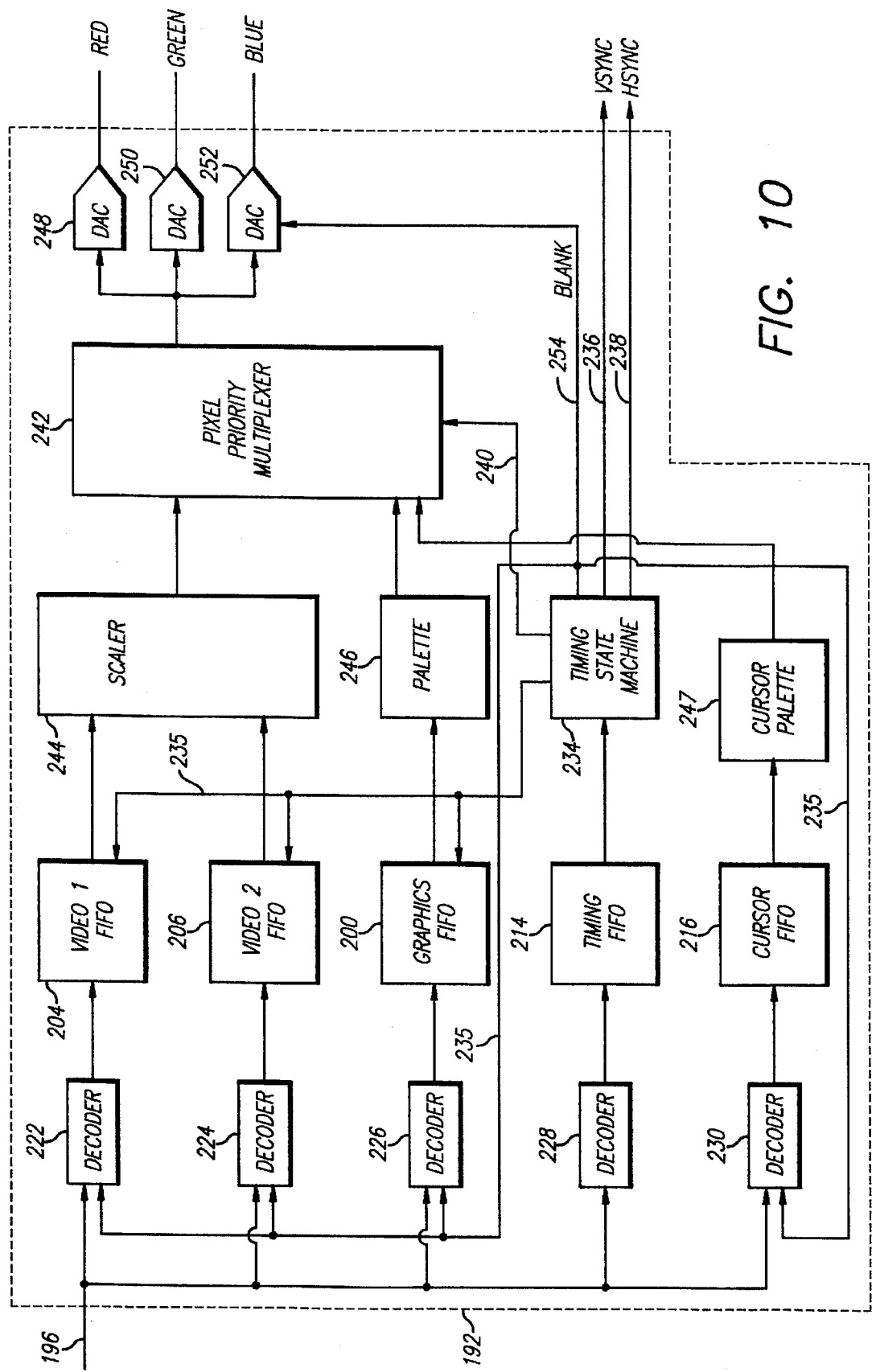
FIG. 10 is an expanded schematic block diagram illustrating one of the blocks in FIG. 9 in additional detail.

In the embodiment shown in FIG. 10, the words or packets on the bus 196 from the graphics controller 190 may pass to the decoder 228 which decodes the bits indicating that the eight (8) data bits in the bytes or packets contain timing and control information rather than digital information for the other FIFO's. These eight (8) bits in the timing and control packets may then pass to the timing FIFO 214. The eight (8) bits may then pass from the FIFO 214 to the timing state machine 234 which produces the timing and control signals indicating the destination of the subsequent words or packets of information. The destination signals may be produced by the timing state machine 234 on lines 235. These signals may accordingly activate one of the decoders 222, 224, 226 and 230. The activated one of the decoders 222, 224, 226 and 230 may then pass the subsequent words or packets of information on the line 218 to the respective ones of the FIFO's 200, 204, 206 and 216.

When the standard interframe video signals pass through one of the video FIFO's 204 and 206, the scaler 244 acts on these signals to scale the number of pixels in each line upwardly. The signals from the scaler 244 may then pass to the pixel priority multiplexer 242. This is the same as in the pixel priority multiplexer 142 shown in FIG. 6. As in the embodiment shown in FIG. 6, the signals from the graphics FIFO 200 may select positions in the palette 246 and these signals may pass to the pixel priority multiplexer 242. Similarly, the signals in the FIFO 216 may select positions in the cursor palette 247 and the signals from the palette may pass to the pixel priority multiplexer 242.

The pixel priority multiplexer 242 may pass the signals from individual ones of the scaler 244, the palette 246 and the cursor palette 247 in accordance with signals on the line 240 from the timing state machine 234. The signals passing through the pixel priority multiplexer 242 are introduced to the color converters 248, 250 and 252. The passage of the signals from the converters 248, 250 and 252 and the display of the signals on the monitor 280 (FIG. 3) are controlled by signals produced on the lines 236, 238 and 254 by the timing state machine 234.

The apparatus disclosed above has several important advantages. It provides for an efficient processing of different types of information including standard interframe video information, graphics information, television information, audio information and cursor information. The system provides for such processing either with a VRAM or a DRAM. In some embodiments, the system employs a data bus for the different types of information and employs a tag bus for the timing and control information. For the RAMBUS embodiment, the system employs a common bus for all of the sub-systems in the system and uses individual bits in each word or packet on such bus to indicate whether the data bits in such word or packet represent media information or timing and control information.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for use with a display monitor for displaying information, the monitor providing a raster scan defined by a plurality of lines and by a plurality of pixels presented at a first particular frequency in each line:

first means for providing standard interframe video signals, second means for providing television signals, third means for providing graphics signals, fourth means for providing color palette signals, fifth means for storing the standard interframe video signals, the television signals, the graphics signals and the color palette signals, sixth means for receiving the standard interframe video signals from the fifth means and for providing an output representative of such standard interframe video signals, seventh means for receiving the television signals from the fifth means and for providing an output representative of such television signals, eighth means for receiving the graphics signals from the fifth means and for providing an output representative of such graphics signals, ninth means for providing a color palette having a plurality of positions each indicative of an individual color when selected, tenth means for introducing the color palette signals from the fifth means to the individual positions in the color palette to obtain an indication of the individual colors at the individual positions in the color palette, the fifth means also storing audio signals, eleventh means for receiving the audio signals from the fifth means and for providing an output representative of such audio signals, and twelfth means for selecting an individual one of the sixth, seventh, eighth, tenth and eleventh means at each instant to obtain the transfer of an individual one of the standard interframe video signals, the television signals, the graphics signals, the color palette signals and the audio signals from the fifth means to such individual one of the sixth, seventh, eighth, tenth and eleventh means at such instant.

2. In combination, first means for providing standard interframe video signals, second means for providing television signals, third means for providing graphics signals, fourth means for providing color palette signals, fifth means for storing the standard interframe video signals, the television signals, the graphics signals and the color palette signals, sixth means for receiving the standard interframe video signals from the fifth means and for providing an output representative of such standard interframe video signals, seventh means for receiving the television signals from the fifth means and for providing an output representative of such television signals, eighth means for receiving the graphics signals from the fifth means and for providing an output representative of such graphics signals, ninth means for providing a color palette having a plurality of positions each indicative of an individual color when selected, tenth means for introducing the color palette signals from the fifth means to the individual positions in the color palette to obtain an indication of the individual colors at the individual positions in the color palette, the fifth means also storing audio signals, eleventh means for receiving the audio signals from the fifth means and for providing an output representative of such audio signals, and twelfth means for activating an individual one of the sixth, seventh, eighth, tenth and eleventh means at each instant to obtain the transfer of an individual one of the standard interframe video signals, the television signals, the graphics signals, the color palette signals and the audio signals from the fifth means, to such individual one of the sixth, seventh, eighth, tenth and eleventh means at such instant, thirteenth means for providing a visual display in a raster scan defined by a plurality of lines, and fourteenth means for storing the signals from the first through fifth means in each line in the raster scan in a particular sequence.

3. In a combination as set forth in claim 2, the fourteenth means including fifteenth means for storing the signals from the first and third means in the fifth means for each line in the raster scan in a timed relationship with such line in the thirteenth means.

4. In a combination as set forth in claim 3, each line in the raster scan by the thirteenth means having a blanking interval, the fifteenth means including sixteenth means for initiating the storage of the signals from the first means in the fifth means for each line in the raster scan before the blanking interval in such line.

5. In a combination as set forth in claim 4, the fifteenth means including seventeenth means for initiating the storage of the signals from the third means for each line in the raster scan during the blanking interval in such line, and the fourteenth means including eighteenth means for storing the signals from the second and fourth means for each line in the raster scan in an asynchronous relationship in such line after the storage of the signals from the first and third means in the fifth means for such line.

6. In combination for use with a monitor for displaying information, the monitor providing a raster scan defined by a plurality of lines and by a plurality of pixels presented in each line:

storage means for storing words of audio information and for providing for the transfer of the words of audio information from the storage means at a first particular frequency, shift register means for receiving the words of audio information from the storage means and for transferring the words of audio information from the shift register means at a second frequency different from the first frequency, a controller for providing for a transfer of bytes in the words of the audio information for each line from the storage means to the shift register means at the first particular frequency, first means for providing a control signal when the shift register means has been filled for any particular line in the raster scan with the bytes of the audio information to a particular percentage of the capacity of the shift register means, and second means responsive to the control signal for interrupting the transfer of the words of the audio information for such particular line from the storage means to the shift register means.

7. In a combination as set forth in claim 6, the shift register means constituting first shift register means, the storage means also storing words of graphics information for display on the video screen, second shift register means for receiving the words of the graphics information from the storage means at the first particular frequency and for transferring the words of the graphics information from the second shift register means at a second particular frequency different from the first particular frequency, and third means for converting the words of the display information transferred from the second shift register means to a form for display on the monitor, the controller providing for the transfer of the words of the display information from the storage means to the second shift register means at a particular time relative to each line.

8. In a combination as set forth in claim 7, the means for converting the words of audio information constituting first converter means, second converter means responsive to the words of the display information from the second shift register means for each line in the raster scan for converting such words to visual information, the controller means being operative to activate the first converter means at first particular times and to selectively activate the second converter means at second particular times different from the first particular times.

9. In a combination as set forth in claim 8 wherein a first bus extends from the controller to the storage means to provide the words of information for storage in the storage means and a second bus extends from the controller to the first and second shift register means to control the time for the transfer of the words of the display information from the storage means to the second shift register means and the selective activation of the first converter means at the first particular times and the second converter means at the second particular times.

10. In a combination as set forth in claim 6, third means for converting the words of the audio information in the shift register means to audible sounds representative of such words of audio information.

11. In a combination as set forth in claim 7, fourth means for converting the words of the audio information in the first shift register means to audible sounds representative of such words, and fifth means for converting the words of the graphics information in the second shift register means to visual information representative of such words.

12. In combination for use with a monitor for displaying information, the monitor providing a raster scan defined by a plurality of lines and by a plurality of pixels presented at a first particular frequency in each line:

storage means for storing words of television information and for providing for the transfer of the words of television information from the storage means at a second particular frequency different from the first particular frequency, shift register means for receiving the words of television information from the storage means and for transferring bytes in the words of television information from the shift register means at the first particular frequency, a controller for providing for a transfer of the words of the television information for each line from the storage means to the shift register means at the second particular frequency, means for providing a control signal when the shift register means has been filled for any particular line in the raster scan with the bytes of the television information to a particular percentage capacity of the shift register means, and means responsive to the provision of the control signal for interrupting the transfer of the words of the television information from the storage means to the shift register means.

13. In a combination as set forth in claim 12, the shift register means constituting first shift register means, the storage means also storing words of graphics information for display on the monitor, second shift register means for receiving the words of graphics information from the storage means and for transferring bytes in the words of the graphics information from the second shift register means at the first frequency, means for converting the words of the graphics information transferred from the second shift register means to a form for display on the monitor, the controller providing for the transfer of the words of the graphics information from the storage means to the second shift register means at a particular time relative to each line in the raster scan.

14. In a combination as set forth in claim 13, the means for converting the bytes of the graphics information constituting first converter means, second converter means responsive to the bytes of the television information from the first shift register means for each line in the raster scan for converting such bytes to visual information, and means for displaying the visual information from the second converter means, the controller means being operative to activate the first converter means at first particular times relative to each line and to selectively activate the second converter means for each line at second particular times different from the first particular times.

15. In a combination as set forth in claim 14 wherein a first bus extends from the controller to the storage means to provide the words of information for storage in the storage means and a second bus extends from the controller to the first and second shift register means to control the time for the transfer of the words of the display information from the storage means to the second shift register means relative to each line and the selection of the first and second converter means for each line to provide visual information.

16. In a combination as set forth in claim 12, the shift register means being operative to receive the words of the television information at a second particular frequency different from the first particular frequency.

17. In a combination as set forth in claim 13, the first shift register means being operative to receive the words of the television information at a second particular frequency less than the first particular frequency and the second shift register means being operative to receive the words of the graphics information at the second particular frequency.

18. In combination for use with a monitor for displaying information, the monitor providing a raster scan defined by a plurality of lines and by a plurality of pixels presented at a first particular frequency in each line, storage means for storing words of different types of digital information selected from a group including standard interface video information, graphics information, audio information and television information for transfer of such different types of information from the storage means, a plurality of shift register means each operative to receive and store the words of an individual one of the different types of digital information, a plurality of first means each associated with an individual one of the shift register means in the plurality and operative to convert to analog form at the first particular frequency bytes in the words of digital information from the individual one of the shift register means in the plurality, and controller means for providing for the transfer of each individual one of the different types of digital information in a particular sequence relative to each line in the raster scan, at a second particular frequency less than the first particular frequency, to the individual one of the shift register means receiving that individual one of the different types of digital information, and second means operatively coupled to the controller means for transferring at each instant the bytes of information from a selective one of the shift register means to a selective one of the first means for the presentation in analog form of the information introduced to such selective one of the first means.

19. In a combination as set forth in claim 18 wherein each word having a plurality of bits, the controller means and the storage means being operative to provide for the passage from the controller means to the storage means of the bits in each successive word of the different types of digital information in parallel form and the storage means being operative to pass the bits in each successive word of the different types of digital information from the storage means to the individual ones of the shift register means in serial form.

20. In a combination as set forth in claim 18 for use with a monitor for displaying information, the monitor providing a raster scan defined by a plurality of lines and by a plurality of pixels in each line, means including a first bus for providing for the transfer of the successive words of the different types of digital information from the controller means to the storage means, and means including a second bus for selecting the individual one of the shift register means to receive the successive words of digital information from the storage means at each instant and for synchronizing the reception by the individual ones of the shift register means of the words of the standard interface video information and graphics information for each line.

21. In a combination as set forth in claim 18 for use with a monitor for displaying information, the monitor providing a raster scan defined by a plurality of lines and by a plurality of pixels in each line, means including a first bus for providing for the transfer of the successive words of the different types of digital information from the controller means to the storage means, and means including a second bus for selecting the individual one of the shift register means in the plurality to receive the successive words of digital information from the storage means at each instant and for synchronizing the reception by such individual one of the shift register means of the words of the standard interface video information and graphics information received by such individual one of the shift register means for each line, each line in the raster scan in the monitor having a blanking interval at the beginning of such line, means including the second bus for initiating the transfer of the words of the standard interframe video information for each line from the storage means to the individual one of the shift register means for the standard interframe video information at a particular time before the blanking interval for such line in the raster scan, and the shift register means for bytes in the words of the graphics information in each line having a capacity less than the number of bytes in such line of the graphics information and the means including the second bus initiating the transfer of the words of the graphics information for each line to the individual one of the shift register means for such graphics information at a time relative to the blanking interval in such line in the raster scan in the monitor to provide substantially full use of such shift register means in such line without preventing any transfer of the words of the graphics information into such shift register means throughout such line because of the full loading of such shift register means.

22. In a combination as set forth in claim 18 for use with a monitor for displaying information, the monitor providing a raster scan defined by a plurality of lines and by a plurality of pixels in each line, each line in the raster scan in the monitor having a blanking interval at the beginning of the line, means including a bus for initiating the transfer of the words of the standard interface video information for each line, at a particular time before the blanking interval, from the storage means to the selective one of the shift register means receiving such words and for initiating the transfer of the words of the graphics information for each line, at a particular time relative to the blanking interval in such line, from the storage means to the individual one of the shift register means receiving such words.

23. In a combination as set forth in claim 22, the shift register means for the bytes of the graphics information having a capacity less than the number of bytes of the graphics information in each line and the controller means being operative to initiate the transfer of the words of the graphics information into such shift register means at a time during the blanking interval in each line in the raster scan in the monitor to provide substantially full use of such shift register means in such line without preventing any transfer of the words of the graphics information into such shift register means throughout such line because of the full loading of such shift register means.

24. In combination for use with a monitor for displaying information, the monitor providing a raster scan defined by a plurality of lines and by a plurality of pixels presented at a first particular frequency in each line:

storage means for storing words of different types of digital information selected from a group including standard interframe video information, graphics information, audio information and television information for a transfer of such different types of information from the storage means, a plurality of shift register means each operative to receive and store the words of an individual one of the different types of digital information and to pass such stored information from such shift register means, a plurality of converter means each associated with an individual one of the shift register means in the plurality and each operative to convert to analog form bytes in the words of digital information from such individual one of the shift register means in the plurality, first means for providing for the transfer of the words of at least a first one of the different types of information, at a particular time relative to each line in the raster scan in the monitor, from the storage means to a first individual one of the shift register means receiving such words, and second means for providing for the transfer of the words of at least a second one of the different types of information in each line, at times relative to such line after the transfer of the words of the first individual one of the different types of information to the first individual one of the shift register means in such line but without reference to any particular time relative to such line, from the storage means to a second individual one of the shift register means receiving such words.

25. In a combination as set forth in claim 24 wherein the words of the first individual one of the different types of information are selected from the group including standard interframe video information and graphics information and wherein the words of the second individual one of the different types of information are selected from the group including audio information and television information.

26. In a combination as set forth in claim 24, means for providing for the transfer of the words of a selective pair of the different types of information in each line in the raster scan, at particular times relative to such line in the raster scan in the monitor and in a particular order for the information in the selective pair of different types, from the storage means to the selective pair of the shift register means in the plurality receiving the selective pair of the different types of information.

27. In a combination as set forth in claim 26, the selective pair of the different types of information constituting a first selective pair and the selective pair of the shift register means in the plurality constituting a first selective pair, means for providing for the transfer of the words of a second selective pair of the different types of information in each line in the raster scan, in a particular order and at times after the transfer of the words of the first selective pair of the different types of information to the first selective respective pair of the shift register means but without reference to any particular time relative to such line, from the storage means to a second selective pair of the shift register means in the plurality.

28. In a combination as set forth in claim 26, there being a blanking interval at the beginning of each line, the means for providing for the transfer of the words of the selective pair of the different types of information relative to each line in the raster scan providing for such transfer at particular times relative to the blanking interval in such line.

29. In a combination as set forth in claim 27, the first selective pair of the different types of information constituting the standard interframe video information and the graphics information and the second selective pair of the different types of information constituting the television information and the audio information.

30. In combination for use with a monitor for displaying information, the monitor providing a raster scan defined by a plurality of lines and by a plurality of pixels presented at a first particular frequency in each line:

storage means for storing words of different types of digital information, selected from a group including standard interframe video information and graphics information, for each line in the raster scan in the monitor, a plurality of shift register means each operative to receive and store the words of an individual one of the different types of information and to pass bytes in such stored information from such shift register means at the first particular frequency, a plurality of converter means each associated with an individual one of the shift register means in the plurality and each operative to convert to analog form the bytes of digital information from such individual one of the shift register means in the plurality, first means for providing for the transfer of the words of the different types of digital information from the storage means to the individual ones of the shift register means at a second frequency less than the first frequency, the first means being operative to initiate the transfer of such words for each line at a particular time relative to such line, the shift register means for the standard interframe video information having a capacity corresponding to the words of digital information for supplying the pixels in each line, the shift register means for the graphics information having a capacity less than that for providing the words for the pixels in each line, the first means being operative to initiate the transfer of the words of graphics information for each line from the storage means to the individual one of the shift register means for such words at a time relative to such line to provide for the transfer of the words for such line into and out of such individual one of the shift register means before the end of such line without overloading the individual one of the shift register means during such line and to provide for the use of substantially the full capacity of the individual one of the shift register means in storing the words of information for such line.

31. In a combination as set forth in claim 30, each of the lines in the raster scan in the monitor having a blanking interval at the beginning of such line, the first means being operative to initiate the transfer of the words of the standard interframe video information from the storage means to the individual one of the shift register means for such words at a time for each line before the beginning of the blanking interval for that line.

32. In a combination as set forth in claim 30, each of the lines in the raster scan in the monitor having a blanking interval at the beginning of such line, there being more than one type of standard interframe video information for each line, there being an individual one of the shift register means for each different type of standard interframe video information, the first means being operative to initiate the transfer of the words of the different types of the standard interframe video information to the individual ones of the shift register means for such words at a time for each line before the beginning of the blanking interval for such line, the first means being operative to transfer the words of the different types of standard interframe video information to the individual ones of the shift register means for such words before the transfer of the words of the graphics information for such line to the individual one of the shift register means receiving such words.

33. In a combination as set forth in claim 30, the storage means also storing words of at least one of television information and audio information in digital form, there being an individual one of the shift register means for the words of the at least one of the television information and the audio information stored in the storage means, the first means being operative to initiate the transfer of the words of the at least one of the television information and the audio information for each line from the storage means to the individual one of the shift register means for such words after the transfer of the words of the standard interframe video information and the graphics information for such line to the individual ones of the shift register means for such words, the first means being operative to initiate the transfer of the words of the at least one of the television information and audio information for such line without reference to any particular time in such line.

34. In combination for use with a monitor for displaying information, the monitor providing a raster scan defined by a plurality of lines and by a plurality of pixels presented at a first particular frequency in each line:

storage means for storing words of digital graphics information and for providing for a transfer of such digital graphics information from the storage means at a second particular frequency less than the first particular frequency, shift register means for receiving and storing the words of the digital graphics information from the storage means and for passing such information from the shift register means in the same order as the reception of such words by the shift register means, the shift register means having a capacity less than that for storing bytes in the words for a complete line of pixels, first means for converting the bytes of the digital graphics information from the shift register means at the first frequency into analog representations of such words, and second means for providing for an initiation of the transfer of the words of the digital graphics information from the storage means into the shift register means at the second particular frequency at a time relative to each line to obtain the transfer of the bytes from the shift register means at the first particular frequency for such line by using substantially the full capacity of such shift register means, without overloading the shift register means, during the transfer of the words of the digital graphics information into the shift register means for such line.

35. In a combination as set forth in claim 34, each line in the raster scan having a blanking interval, the shift register means having a capacity, and the initiation of the transfer of the words of the digital graphics information from the storage means to the shift register means occurring at a time relative to the blanking interval in each line, to substantially fill the shift register means with such words during the transfer of such words into the shift register means for such line without overloading the shift register means during the transfer of the words of the digital graphics information into the shift register means for such line.

36. In a combination as recited in claim 35, means for providing a control signal for each line if and when the shift register means becomes full with the words of the digital graphics information before the end of such line, and means responsive to the control signal for interrupting the transfer of the words of the digital graphics information from the storage means to the shift register means for such line.

37. In a combination as recited in claim 34, means including a line for providing clock signals at the second particular frequency and for introducing such clock signals to the shift register means to provide for the transfer of the words of the digital graphics information from the storage means to the shift register means in synchronism with such clock signals, and means including a bus for providing for the selection of the shift register means to receive the words of the digital graphics information for each line at a particular time relative to the blanking interval in such line.

38. In combination for use with a monitor for displaying information, the monitor providing a raster scan defined by a plurality of lines and by a plurality of pixels presented at a first particular frequency in each line:

storage means for storing words of digital standard interframe video information and for providing for a transfer of such information from the storage means at a second particular frequency less than, and unrelated to, the first particular frequency, shift register means for receiving and storing the words of the digital standard interframe video information and for passing such words from the shift register means in the same order as the reception of such words by the shift register means, means for converting bytes in the words of the digital standard interframe video information from the shift register means at the first particular frequency into analog representations of such bytes, and means for initiating the transfer of the words of the digital standard interframe video information into the shift register means at the second frequency at a time relative to each line to obtain the transfer of such words from the shift register means at the first particular frequency for such line, each of the lines having a blanking interval, means for providing clock signals at the second particular frequency and for introducing such clock signals to the shift register means to provide for the transfer of the words of the digital standard interframe video information from the storage means to the shift register means in synchronism with the clock signals, and means including a bus for providing for the activation of the shift register means to receive the words of the digital standard interframe video information for each line at a particular time relative to the blanking interval in such line, the bus providing a tag indicating in digital form the time for the initiation of the transfer of the words of the digital standard interframe video signals from the storage means to the shift register means for each line, and the means including the bus also including a state machine for decoding the tag to provide a synchronizing signal for initiating the transfer of the words of the digital standard interframe video information from the storage means to the shift register means at a particular time relative to each line, and means for initiating the transfer of the words of the digital standard interframe video information from the storage means to the shift register means in accordance with the provision of the synchronizing signal.

39. In combination for use with a monitor for displaying information, the monitor providing a raster scan defined by a plurality of lines and by a plurality of pixels presented at a first particular frequency in each line:

storage means for providing words of digital information from a group of different types of information including standard interframe video information, graphics information, television information and audio information for the transfer of such words from the storage means, a plurality of shift register means each operative to receive and store the words of digital information from an individual one of the different types in the group and, after a delay, to transfer bytes in such words from such shift register means at the first particular frequency in the same order as received, a plurality of converter means operative to receive the bytes of digital information from individual ones of the shift register means in the plurality and to produce analog signals representative of such bytes, first means including a bus for providing on the bus digital signals indicating the individual one of the shift register means in the plurality to be activated at each instant to receive words of the individual one of the different types of digital information from the storage means at that instant at the second particular frequency, and second means responsive to the digital signals from the first means at each instant for selecting the individual one of the shift register means in the plurality to receive words of the individual one of the different types of digital information from the storage means at that instant.

40. In combination for use with a monitor for displaying information, the monitor providing a raster scan defined by a plurality of lines and by a plurality of pixels presented at a first particular frequency in each line:

storage means for providing words of digital information from a group of different types of information including standard interframe video information, graphics information, television information and audio information for the transfer of such words from the storage means, a plurality of shift register means each operative to receive and store the words of digital information from an individual one of the different types in the group and, after a delay, to transfer bytes in such words from such shift register means at the first particular frequency in the same order as received, a plurality of converter means operative to receive the bytes of digital information from individual ones of the shift register means in the plurality and to produce analog signals representative of such bytes, first means including a bus for providing on the bus digital signals indicating the individual one of the shift register means in the plurality to be activated at each instant to receive words of the individual one of the different types of digital information from the storage means at that instant at a second particular frequency less than the first particular frequency, and second means responsive to the digital signals from the first means at each instant for selecting the individual one of the shift register means in the plurality to receive words of the individual one of the different types of digital information from the storage means at that instant, the storage means being operative to transfer the words of the digital information from the storage means at the second particular frequency.

41. In combination for use with a monitor for displaying information, the monitor providing a raster scan defined by a plurality of lines and by a plurality of pixels presented at a first particular frequency in each line:

storage means for providing words of digital information from a group of different types of information including standard interframe video information, graphics information, television information and audio information for transfer of such words from the storage means, a plurality of shift register means each operative to receive and store the words of digital information from an individual one of the different types in the group and, after a delay, to transfer bytes in such words from such shift register means at the first particular frequency in the same order as received, a plurality of converter means operative to receive the bytes of digital information from individual ones of the shift register means in the plurality and to produce analog signals representative of such bytes, first means including a bus for providing on the bus digital signals indicating the individual one of the shift register means in the plurality to be activated at each instant to receive words of the individual one of the different types of digital information from the storage means at that instant at a second particular frequency less than the first particular frequency, and second means responsive to the digital signals from the first means at each instant for selecting the individual one of the shift register means in the plurality to receive words of the individual one of the different types of digital information from the storage means at that instant, the first means including the bus also including state machine means responsive to the digital signals on the bus for determining the order in which the words of the different types of the digital information are to be transferred for each line to the individual ones of the shift register means in the plurality, and the second means being responsive to the determinations of the order by the state machine means for selecting the individual one of the shift register means to receive the words of digital information from the storage means at that instant.

42. In a combination as set forth in claim 41, the state machine means being responsive to the digital signals on the bus for determining for each line the times at which the words of individual ones of the different types of information are to be transferred from the storage means to the individual ones of the shift register means receiving such words.

43. In a combination as set forth in claim 42, each line having a blanking interval at the beginning of the line, the state machine means being responsive to the digital signals on the bus for initiating the transfer of the words of the digital standard interframe video information, at a particular time for each line relative to the blanking interval for that line, from the storage means to the individual one of the shift register means receiving such words and for initiating the transfer of the words of the digital graphics information, at a particular time for each line relative to the transfer of the words of standard interframe video information, from the storage means to the individual one of the shift register means receiving such words of the digital graphics information.

44. In combination for use with a monitor for displaying information, the monitor providing a raster scan defined by a plurality of pixels presented at a first particular frequency in each line:

storage means for holding words of different types of digital information selected from a group including standard interframe video information, graphics information, television information and audio information, a plurality of shift register means each operative to receive and store the words of an individual one of the different types of digital information and to transfer such digital information from such shift register means in the same order as received, an additional shift register means, the storage means also holding additional words of digital information providing timing information and providing for the selective transfer of the additional words of digital information from the storage means to the additional shift register means, first means for selecting the additional shift register means at particular times, second means responsive to the selection of the additional shift register means for providing for the transfer of the additional words of digital information from the storage means to the additional shift register means, third means responsive to the additional words of digital information in the additional shift register means for decoding such information to provide timing signals and control signals providing for the selective transfer of the words of digital information from an individual one of the shift register means in the plurality, fourth means responsive to the timing signals and the control signals for obtaining a selective transfer of the words of digital information from the individual one of the shift register means in the plurality for each line, and fifth means for processing bytes in the words of digital information selectively transferred from the individual one of the shift register means in the plurality to convert such bytes to analog information.

45. In combination for use with a monitor for displaying information, the monitor providing a raster scan defined by a plurality of pixels presented at a first particular frequency in each line:

storage means for holding words of different types of digital information selected from a group including standard interframe video information, graphics information, television information and audio information, a plurality of shift register means each operative to receive and store the words of an individual one of the different types of digital information and to transfer such digital information from such shift register means in the same order as received, an additional shift register means, the storage means also holding additional words of digital information providing timing information and providing for the selective transfer at each instant of the words of additional information from the storage means in the plurality to the additional shift register means, first means including a bus for selecting the additional shift register means at particular times, second means responsive to the selection of the additional shift register means for providing for the transfer of the additional words of digital information to the additional shift register means, third means responsive to the additional words of digital information in the additional shift register means for decoding such information to provide timing signals and control signals providing for the selective transfer of the words of digital information from an individual one of the shift register means in the plurality, fourth means responsive to the timing signals and the control signals for obtaining a selective transfer of the words of digital information from the individual one of the shift registers in the plurality for each line, and fifth means for processing bytes in the words of digital information selectively transferred from the individual one of the shift register means in the plurality to convert such words to analog information, each additional word having a plurality of binary bits, first bits in each additional word providing the information for the production of the timing and control signals, the third means being responsive to the first bits in each additional word for decoding such first bits to provide the timing signals and the control signals controlling the selective transfer of the words of digital information from the individual one of the shift register means in the plurality, sixth means for providing clock signals at a particular frequency, second bits in each additional word being responsive to the clock signals for providing a count of the clock signals in each additional word, the fifth means being responsive to the count of the clock signals in each additional word and to the timing signals and the control signals decoded in such additional word for processing the bytes of digital information selectively transferred from the individual one of the shift register means in the plurality to convert such bytes to analog information.

46. In combination for use with a monitor for displaying information, the monitor providing a raster scan defined by a plurality of pixels presented at a first particular frequency in each line:

storage means for holding words of different types of digital information selected from a group including standard interframe video information, graphics information, television information and audio information, a plurality of shift register means each operative to receive and store the words of an individual one of the different types of digital information and to transfer such digital information from such shift register means in the same order as received, an additional shift register means, the storage means also holding additional words of digital information providing timing information and providing for the selective transfer at each instant of the additional words of digital information from the storage means in the plurality to the additional shift register means, first means including a bus for selecting the additional shift register means at particular times, second means responsive to the selection of the additional shift register means for providing for the transfer of the additional words of digital information to the additional shift register means, third means responsive to the additional words of digital information in the shift register means for decoding such information to provide timing signals and control signals providing for the selective transfer of the words of digital information from an individual one of the shift register means in the plurality, fourth means responsive to the timing signals and the control signals for obtaining a selective transfer of the words of digital information from the individual one of the shift registers in the plurality for each line, and fifth means for processing the words of digital information selectively transferred from the individual one of the shift register means in the plurality to convert such words to analog information, and sixth means responsive to the count of the clock signals in each additional word for providing for the transfer of the words of the individual one of the different types of the digital information from the storage means into the individual one of the shift register means in the plurality receiving and storing such individual one of the different types of the digital information.

47. In combination for displaying information in a raster scan defined by a plurality of pixels presented at a first particular frequency in each line:

storage means for holding words of different types of digital information selected from a group including standard interframe video information, graphics information, television information and audio information, a plurality of shift register means each operative to receive and store the words of an individual one of the different types of digital information and to transfer such digital information from such shift register means in the same order as received, an additional shift register means, the storage means also holding additional words of digital information providing timing information and providing for the selective transfer at each instant of the additional words of digital information from the storage means in the plurality to the additional shift register means, first means including a bus for selecting the additional shift register means at particular times, second means responsive to the selection of the additional shift register means for providing for the transfer of the additional words of digital information to the additional shift register means, third means responsive to the additional words of digital information in the shift register means for decoding such information to provide timing signals and control signals providing for the selective transfer of the words of digital information from an individual one of the shift register means in the plurality, fourth means responsive to the timing signals and the control signals for obtaining a selective transfer of the words of digital information from the individual one of the shift registers in the plurality for each line, fifth means for processing bytes in the words of digital information selectively transferred from the individual one of the shift register means in the plurality to convert such words to analog information, and a monitor for displaying information, the monitor providing the raster scan defined by the plurality of lines and by the plurality of pixels presented at the first particular frequency in each line, there being horizontal sync signals in each line in the raster scan and blanking signals in such line and vertical sync signals at the end of such raster scan, the third means being responsive to the additional words of digital information for decoding such digital information to provide the horizontal sync signals for such line and the blanking signals for such line and the vertical sync signals for such raster scan.

48. In a combination as set forth in claim 45, each additional word having a plurality of binary bits, first bits in each additional word providing the information for the production of the timing and control signals, the third means being responsive to the first bits in the additional words for decoding such first bits to provide the timing signals and the control signals controlling the selective transfer of the words of digital information from the individual one of the shift register means in the plurality, sixth means for providing clock signals at the first particular frequency, second bits in the plurality being responsive to the clock signals for providing a count of the clock signals in each additional word, the fifth means being responsive to the count of the clock signals and to the timing signals and the control signals for processing the words of digital information selectively transferred from the individual one of the shift register means in the plurality to obtain analog information.

49. In combination for use with a monitor for displaying information, the monitor providing a raster scan defined by a plurality of lines and by a plurality of pixels presented at a first particular frequency in each line:

first means for providing words of different types of digital information selected from a group including standard interframe video information, graphics information, television information and audio information, a plurality of shift register means each operative to receive the words of an individual one of the different types of digital information, an additional shift register means for receiving additional words of digital information indicative of timing and controls, second means for providing for the selection at each instant of an individual one of the shift register means in the plurality or the additional shift register means, the first means also providing words of digital information of an additional type for providing for the timing and transfer of the words of the different types of the digital information from the individual one of the shift register means in the plurality and the processing of such transferred words, third means responsive to the selection by the second means of an individual one of the shift register means in the plurality or the additional shift register means for processing the words of the digital information received by such individual one of the shift register means in the plurality or the additional shift register means, and fourth means responsive to the words of the digital information introduced to the additional shift register means for processing such words of digital information to obtain the selection of the individual one of the shift register means in the plurality and the processing of the words of the digital information in the individual one of the shift register means in the plurality in accordance with the timing and control information in the words in the additional shift register means.

50. In a combination as set forth in claim 49, each of the additional words of digital information having a plurality of bits, fifth means for providing clock signals at the first particular frequency, sixth means for providing a count of the clock signals to a value indicated by first bits in each additional word, and seventh means responsive to the count of the clock signals as provided by the sixth means for processing second bits in each additional word to provide the timing and control for the processing of the words of digital information in the individual one of the shift register means in the plurality.

51. In a combination as set forth in claim 50, eighth means for loading, at a second particular frequency less than the first particular frequency, the words of each different type of the digital information into the individual one of the shift register means receiving such different type of the digital information, and ninth means for synchronizing the loading provided by the eighth means in accordance with the count provided by the sixth means.

52. In a combination as set forth in claim 50, a plurality of eighth means each associated with an individual one of the shift register means in the plurality for processing the words of digital information in such individual one of the shift register means in the plurality, the eighth means being associated with the shift register means for the standard interframe video information and the graphics information being operative in synchronism with the clock signals.

53. In combination for use with a monitor for displaying information, the monitor providing a raster scan defined by a plurality of lines and by a plurality of pixels in each line:

storage means having a plurality of positions each storing indications in binary form of the intensity of each of three primary colors, first means responsive to the selection of any individual one of the positions in the storage means for converting to analog form the indications in binary form of each of the three (3) primary colors at such position, second means for selecting, for each of the pixels in each line in the raster scan in the monitor, an individual one of the positions in the storage means for display at such pixel of an image in accordance with the indications in binary form at such position in the storage means of the intensity of each of the three primary colors, and third means operative at the end of each raster scan for updating the indications in binary form of the intensity of the three (3) primary colors at each of the positions in the storage means.

54. In combination for use with a monitor for displaying information, the monitor providing a raster scan defined by a plurality of lines and by a plurality of pixels in each line:

storage means having a plurality of positions each storing indications in binary form of the intensity of each of three primary colors, first means responsive to the selection of any individual one of the positions in the storage means for converting to analog form the indications in binary form of each of the three (3) primary colors at such position, second means for selecting, for each of the pixels in each line in the raster scan in the monitor, an individual one of the positions in the storage means for display at such pixel of an image in accordance with the indications in binary form at such position in the storage means of the intensity of each of the three primary colors, and third means operative at the end of each raster scan for updating the indications in binary form of the intensity of the three (3) primary colors at each of the positions in the storage means, each raster scan providing for a vertical retrace at the end of such raster scan, the third means being operative during the vertical retrace in each raster scan to update the indications of the intensity of the primary colors at each of the positions in the storage means.

55. In a combination as set forth in claim 54, the monitor being operative to present the pixels in each line at the first particular frequency, the second means including shift register means for receiving and storing words of binary information for each line in the raster scan in the monitor and for transferring such words of binary information from the shift register means in the same order as received by the shift register means, and the third means further including fourth means for transferring into the shift register means from the storage means during the vertical retrace period the words of binary information, at a second frequency less than the first frequency, to provide for an updating of the indications of the intensity of the three (3) primary colors at the different positions in the storage means.

56. In combination as set forth in claim 55, means including a bus for providing indications of the times when the words of the binary indications are to be transferred into the shift register means and for activating the fourth means at such times and for providing indications of the times when the different positions in the storage means are to be updated by the words of binary indications in the shift register means and when the third means are to provide such updating.

57. In combination for use with a monitor for displaying information, the monitor providing a raster scan defined by a plurality of lines and by a plurality of pixels presented in each line at a first particular frequency:

first storage means for storing words indicative of different types of binary information selected from a group including standard interframe video information, graphics information, television information and audio information, second storage means for providing a plurality of positions each storing in binary form indications of the intensity of the three binary indications cumulatively indicating an individual color for the graphics information, a plurality of shift register means each operative to receive and store words of an individual one of the different types of binary information and to transfer such words from such individual one of the shift register means in the same order as received by such individual one of the shift register means, first means for providing for the transfer of the words indicative of the different types of binary information, in a particular order in each line in the raster scan in the monitor, to the shift register means in the plurality at a second particular frequency greater than the first particular frequency, second means for selecting in each line at each instant an individual one of the shift register means in the plurality to transfer at that instant from the shift register means the words in such shift register means, and third means for transferring into each position in the second storage means at the end of each raster scan, from the particular one of the shift register means receiving the words of graphics information, the indications of the intensity of the three binary colors cumulatively indicating an updated color for such position in the second storage means.

58. In a combination as set forth in claim 57, an additional shift register means for indicating the times for the transfer of the words of the different ones of the types of binary indications into the individual ones of the shift registers in the plurality receiving such binary indications, fourth means for transferring at particular times into the additional shift register means from the first storage means the words of the binary indications providing the information for the times for the transfer of the different types of binary indications into the different ones of the shift register means in the plurality receiving such binary indications, the first means being responsive to the binary indications from the additional shift register means for transferring, at the times indicated by the additional shift register means, the words indicative of the different types of binary indications transferred to the individual ones of the shift register means receiving such binary indications.

59. In a combination as set forth in claim 58, fifth means including a bus for activating the fourth means to provide a transfer at the particular times into the additional shift register means from the first storage means of the words of the binary indications providing the information for the times for the transfer of the different types of binary indications into the individual ones of the shift register means in the plurality receiving such binary indications.

60. In a combination as set forth in claim 58, fifth means for processing the words of the binary indications transferred from the individual ones of the shift register means in the plurality, and sixth means for obtaining the processing by the fifth means of the words of the binary indications passing from the individual ones of the shift register means in the plurality.

61. In a combination as set forth in claim 57, fifth means for processing the words of the binary indications transferred from the individual ones of the shift register means in the plurality, and sixth means responsive to the indications from the additional shift register means for obtaining the processing by the fifth means of the words of binary indications passing from the individual ones of the shift register means in the plurality.

62. In a combination as set forth in claim 57, each raster scan in the monitor having a vertical retrace period at the end of such raster scan, and fourth means including a bus for selecting the third means during the vertical retrace in each raster scan to obtain a transfer by the third means into the second storage means of the indications of the intensity of the three (3) primary colors cumulatively indicating an updated color for each position in the second storage means, these indications being obtained from the individual one of the shift register means receiving the words of graphics information.

63. In combination for use with a monitor for displaying information, the monitor providing a raster scan defined by a plurality of lines and by a plurality of pixels presented in each line at a first particular frequency:

storage means for storing words of different types of digital information selected from a group including standard interframe video information, graphics information, television information and audio information, a plurality of shift register means each operative to receive and store the words of an individual one of the different types of digital information and to transfer such words from such shift register means in the same order as received by such shift register means, first means for providing for a transfer of the words of the different types of digital information to the shift register means in the plurality at a second particular frequency lower than the first particular frequency, second means for indicating at each instant the individual one of the shift register means from which digital information is to be transferred at each instant, and a plurality of decoding means each operatively coupled to an individual one of the shift register means in the plurality and each responsive to the indications from the second means for activating such individual one of such shift register means in the plurality to obtain a transfer of the words of digital information from the individual one of the shift register means.

64. In a combination as set forth in claim 63, the storage means being operative to store the words of an additional one of the different types of digital information, an additional shift register means operative to receive and store the words of the additional one of the different types of digital information and to transfer such words from such additional shift register means in the same order as received by such shift register means, the second means also indicating the individual one of the shift register means from which digital information is to be transferred at each instant, the additional words of digital information indicating the timing for the transfer of the words of the different types of digital information from the individual ones of the shift register means in the plurality, and third means responsive to the additional words of digital information in the additional shift register means for timing the transfer of the words of the different types of digital information from the individual ones of the shift register means in the plurality into the individual ones of the decoding means in the plurality.

65. In a combination as set forth in claim 63, the second means including a bus and indicating at each instant the individual one of the shift register means to receive the words of digital information being transferred from the storage means at that instant, and the first means being responsive to the indications from the second means for transferring the words of the individual types of the digital information into the individual one of the shift register means in the plurality at the second particular frequency.

66. In a combination as set forth in claim 64, the additional words of digital information also indicating the timing for the transfer of the individual types of digital information into the individual ones of the shift register means in the plurality at the second particular frequency, the first means being responsive to the timing indications from the second means for transferring the words of the individual types of the digital information into the individual ones of the shift register means in the plurality at the second particular frequency.

67. In a combination as set forth in claim 57, the third means being operative to transfer at the first frequency at each instant the words of digital information from the individual ones of the shift register means in the plurality at such instant.

68. In combination for use with a monitor for displaying information, the monitor providing a raster scan defined by a plurality of lines and by a plurality of pixels in each line:

first means for providing words of different types of digital information selected from a group including standard interframe video information, graphics information, television information and audio information, storage means for storing the words of the different types of digital information, second means for introducing into the storage means, in parallel form, the words of the different types of digital information from the first means, a plurality of shift register means each operative to receive and store the words of an individual one of the different types of digital information and to transfer such words from the shift register means in the same order as received, and third means for serially transferring to the individual ones of the shift register means in the plurality, in a particular order for each line and initiated at a particular time relative to the beginning of each line, the words of the different types of information for such line.

69. In combination for use with a monitor for displaying information, the monitor providing a raster scan defined by a plurality of lines and by a plurality of pixels in each line, first means for providing words of different types of digital information selected from a group including standard interframe video information, graphics information, television information and audio information, storage means for storing the different types of digital information, second means for introducing into the storage means, in parallel form, the words of the different types of digital information, a plurality of shift register means each operative to receive and store the words of an individual one of the different types of digital information and to transfer such words from the shift register means in the same order as received, and third means for serially transferring to the individual ones of the shift register means in the plurality, in a particular order for each line, the words of the different types of information for such line, the pixels in each line in the raster scan in the monitor being presented at a first particular frequency, the third means being operative to transfer the words of the different types of digital information into the individual ones of the shift register means in the plurality at a second particular frequency less than the first particular frequency.

70. In a combination as set forth in claim 69, there being a blanking interval at each line in the raster scan in the monitor, and fourth means for obtaining the serial transfer by the third means into the individual ones of the shift register means in the plurality of the words of the different types of digital information at particular times related to the blanking interval in each line.

71. In combination for use with a monitor for displaying information, the monitor providing a raster scan defined by a plurality of lines and by a plurality of pixels in each line, first means for providing words of different types of digital information selected from a group including standard interframe video information, graphics information, television information and audio information, storage means for storing the different types of digital information, second means for introducing into the storage means, in parallel form, the words of the different types of digital information, a plurality of shift register means each operative to receive and store the words of an individual one of the different types of digital information and to transfer such words from the shift register means in the same order as received, and third means for serially transferring into the individual ones of the shift register means in the plurality, in a particular order for each line, the words of the different types of information for such line, each line in the raster scan in the monitor having a blanking interval at the beginning of such line and fourth means for initiating the transfer of the words of the digital standard interframe video information into the associated one of the shift register means in the plurality at a particular time for each line before the blanking interval for that line and for the transfer of the words of the digital graphics information into the associated one of the shift register means in the plurality at a particular time for each line after the transfer of the words of the digital standard interframe video information into the shift register means for that line.

72. In a combination as set forth in claim 71, the fourth means being operative to transfer the words of other ones of the different types of digital information from the storage means into the associated ones of the shift register means in the plurality for each line after the transfer of the words of the individual ones of the digital standard interframe video information and the digital graphics information into the shift register means in the plurality for such line and to provide such transfer without reference to any particular time in such line.

73. In combination for use with a monitor for displaying information, the monitor providing a raster scan defined by a plurality of lines and by a plurality of pixels in each line:

storage means for storing words of different types of digital information selected from a group including standard interframe video information, graphics information, television information and audio information, a plurality of shift register means such operative to receive and store an individual one of the different types of digital information and to transfer such individual one of the different types of digital information from such shift register means in the same order as received, first means for providing a transfer in a particular order of the words of the different types of digital information from the storage means into the individual ones of the shift register means for each line in the raster scan in the monitor, the storage means also storing words of digital cursor information, an additional shift register means for receiving and storing the words of the digital cursor information and for transferring the words from the additional shift register means in the same order as received, and second means for providing a transfer of the words of the digital cursor information to the additional shift register means for a particular line in the raster scan in the monitor, third means for processing the words of digital information transferred from the shift register means in the plurality and from the additional shift register means, fourth means for providing binary indications controlling the transfer at each instant of the words of the digital information from the individual ones of the shift register means in the plurality and the additional shift register means to the third means, and fifth means responsive to the binary indications from the fourth means for transferring the words of the digital information from the individual ones of the shift register means and the additional shift register means to the third means.

74. In combination for use with a monitor for displaying information, the monitor providing a raster scan defined by a plurality of lines and by a plurality of pixels in each line:

storage means for providing words of different types of digital information selected from a group including standard interframe video information, graphics information, television information and audio information, a plurality of shift register means each operative to receive and store an individual one of the different types of digital information and to transfer such digital information in the same order as received and stored, first means for transferring the digital information in the storage means to the shift register means in the plurality, second means for providing tags for the words of digital information transferred from the storage means to the shift register means in the plurality, each tag being indicative of the individual one of the shift register means to which an individual one of the words of digital information in the storage means is to be transferred, and third means responsive to the tags from the second means for providing for the transfer of the individual ones of the words of digital information by the first means from the storage means to the individual ones of the shift register means in the plurality in accordance with the indication in the tags of such individual ones of the shift register to receive such words.

75. In combination for use with a monitor for displaying information, the monitor providing a raster scan defined by a plurality of lines and by a plurality of pixels in each line, storage means for providing words of different types of digital information selected from a group including standard interframe video information, graphics information, television information and audio information, a plurality of shift register means each operative to receive and store an individual one of the different types of digital information and to transfer such digital information in the same order as received and stored, first means for transferring the digital information in the storage means to the shift register means in the plurality, second means for providing tags for the words of digital information transferred from the storage means to the shift register means in the plurality, each tag being indicative of the individual one of the shift register means to which a word of digital information in the storage means is to be transferred, and third means responsive to the tags from the second means for providing for the transfer of the words of digital information by the first means from the storage means to the individual ones of the shift register means in the plurality in accordance with the indication in the tags of such individual ones of the shift register to receive such words, the third means including fourth means for decoding the tag and including additional shift register means for receiving and storing the decoded information and for transferring the decoded information from the additional shift register means, the third means also including fifth means responsive to the decoded information from the fourth means for activating the individual ones of the shift register means selected to receive the words of digital information from the storage means.

76. In combination for use with a monitor for displaying information, the monitor providing a raster scan defined by a plurality of lines and by a plurality of pixels in each line:

storage means for providing words of different types of digital information selected from a group including standard interframe video information, graphics information, television information and audio information, a plurality of shift register means each operative to receive and store an individual one of the different types of digital information and to transfer such digital information in the same order as received and stored, first means for transferring the digital information in the storage means to the shift register means in the plurality, second means for providing tags for the words of digital information transferred from the storage means to the shift register means in the plurality, each tag being indicative of the individual one of the shift register means to which an individual one of the words of digital information in the storage means is to be transferred, and third means responsive to the tags from the second means for providing for the transfer of the individual ones of the words of digital information by the first means from the storage means to the individual ones of the shift register means in the plurality in accordance with the indication in the tags of such individual ones of the shift register means to receive such words, the pixels in each line in each raster scan in the monitor being presented at a first particular frequency, the first means being operative to transfer the words of the digital information in the storage means to the shift register means in the plurality at a second particular frequency less than the first particular frequency.

77. In a combination as set forth in claim 75, the fifth means providing for the transfer of first individual ones of the different types of digital information, at particular times relative to each line in each raster scan in the monitor, to first individual ones of the shift register means selected to receive such words in the plurality and providing for the transfer of second individual ones of the different types of digital information, after the transfer of the words of the first individual ones of the words of digital information relative to such line and without reference to any particular times in such line, to second individual ones of the shift register means selected to receive such words in the plurality.

78. In a combination as set forth in claim 77, sixth means for processing the words of digital information transferred from the shift register means in the plurality, the fifth means being operative to select at each instant the particular one of the shift register means in the plurality to transfer words of digital information to the sixth means for processing by the sixth means.

79. In combination for use with a monitor for displaying information, the monitor providing a raster scan defined by a plurality of lines and by a plurality of pixels in each line:

controller means for providing words of the different types of digital information selected from a group including standard video information, graphics information, television information and audio information, storage means for storing words of the different types of digital information transferred from the controller means, a plurality of shift register means each operative to receive and store the words of an individual one of the different types of digital information and to transfer such words from such individual one of the shift register means in the same order as received by such shift register means, first means for transferring the words of the different types of digital information from the controller means to the storage means, second means in the controller means for providing digital information controlling the selective transfer in a particular sequence of the words of the different types of digital information from the storage means to the individual ones of the shift register means in the plurality, third means for processing the different types of the digital information in the individual ones of the shift register means, and fourth means for providing a transfer of the words of the different types of the digital information from the shift register means in the plurality to the third means in a particular sequence for each line in the raster scan.

80. In a combination as set forth in claim 79 wherein the storage means includes a dynamic random access memory.

81. In a combination as set forth in claim 79, the second means including fifth means for providing a tag bus controlling the selective transfer of the words of the different types of digital information from the storage means to the individual ones of the shift register means in the plurality, and the third means including sixth means responsive to the tag bus for providing a transfer of the words of the different types of digital information from the individual ones of the shift register means in the plurality.

82. In a combination as set forth in claim 80, the tag bus provided by the fifth means providing control information in binary coded form, the third means including sixth means for decoding the binary coded control information in the tag bus to provide the transfer of the words of the different types of the digital information from the controller means to the individual ones of the shift register means in the plurality.

83. In combination for use with a monitor for displaying information, the monitor providing a raster scan defined by a plurality of lines and by a plurality of pixels in each line:

controller means for providing words of different types of digital information selected from a group including standard interframe video information, graphics information, television information and audio information, storage means for receiving and storing the words of the different types of digital information and for transferring such words from the storage means, a plurality of shift register means each operative to receive and store the words of an individual one of the different types of digital information and for transferring such words from the shift register means in the same order as received, first means including a first bus extending from the controller means for addressing the storage means with respect to the transfer of words of digital information between the controller means and the storage means, second means including a second bus common to the controller means, the storage means and the shift register means in the plurality for providing digital information for the transfer of the words of the different types of digital information between the controller means, the storage means and the individual ones of the shift register means in the plurality, and third means responsive to the digital information from the second means for providing on the second bus digital instructions controlling the transfer of the words of the different types of digital information between the controller means, the storage means and the individual ones of the shift register means in the plurality.

84. In a combination as set forth in claim 83, the third means including fourth means for decoding the digital information in the second means, the third means including fifth means responsive to the decoded digital information from the fourth means for providing for the transfer, at particular times for each line in each raster scan in the monitor, of the words of first individual ones of the different types of digital information from the storage means to the individual ones of the shift register means in the plurality receiving such words.

85. In a combination as set forth in claim 84, the third means including sixth means responsive to the decoded digital instructions for providing for the transfer, after the transfer of the words of the individual ones of the different types of digital information from the storage means for each line but without any reference to any particular time relative to such line, of the words of second individual ones of the different types of digital information from the storage means to the individual ones of the shift register means in the plurality receiving such words, the second individual ones of the different types of the digital information from the storage means being different from the first individual ones of the different types of digital information from the storage means.

86. In a combination as set forth in claim 85, each of the lines having a blanking interval at the beginning of the line, the fifth means being operative to transfer, at particular times for each line relative to the blanking interval in such line, the words of the first individual ones of the different types of digital information to the individual ones of the shift register means in the plurality.

87. In a combination as set forth in claim 84, the pixels in each line being presented at a particular clock frequency, the fifth means being operative to introduce to the controller means a synchronizing signal for each line, and the fifth means including seventh means for providing for the transfer of the words of the first individual ones of the different types of digital information from the shift register means in the plurality at a particular time relative to each line and at the particular clock frequency.

88. In a combination as set forth in claim 84, the pixels in each line being presented at a particular clock frequency, the third means being operative to introduce to the controller means a synchronizing signal for each line, the third means being operative to provide for the transfer of the words of the graphics digital information from the individual one of the shift register means for the graphics information at a particular time for each line and at the particular clock frequency, the individual one of the shift register means in the plurality for the graphics information having a capacity to store a number of words less than the number of pixels in each line, the fifth means being operative to initiate the transfer of the words of the graphics digital information from such individual one of the shift register means at a particular time for each line to provide a substantially full, without any overflow, utilization of the capacity of such shift register means during the transfer of the words of the graphics digital information for such line into such individual one of the shift register means.

89. In a combination as set forth in claim 88, the third means being operative to transfer the words of the digital television information and the digital audio information into second individual ones of the shift register means for each line at a time unrelated to any specific time in such line but after the transfer for such line of the graphics digital information into the shift register means for such graphics information.

90. In combination for use with a monitor for displaying information, the monitor providing a raster scan defined by a plurality of lines and by a plurality of pixels in each line:

controller means for providing words of different types of digital information selected from a group including standard interframe video information, graphics information, television information and audio information, storage means for receiving and storing the words of the different types of digital information for transfer of such words from the storage means, a plurality of shift register means each operative to receive from the storage means and store the words of an individual one of the different types of digital information and for transferring such words from the shift register means in the same order as received, first means including a first bus extending from the controller means to the storage means to address the storage means to provide a controlled transfer of the words of digital information into and out of the storage means, second means including a second bus extending between the controller means, the storage means and the shift register means in the plurality for transferring the words of the different types of digital information between the controller means, the storage means and the shift register means in the plurality, and third means for providing a controlled transfer of the words of the individual ones of the different types of digital information from the storage means through the second bus to the individual ones of the shift register means receiving such words.

91. In a combination as set forth in claim 90, the storage means constituting at least one dynamic RAM.

92. In a combination as set forth in claim 90, the third means providing additional words of digital information providing for the selective transfer of the words of the individual ones of the different types of digital information for each line in the raster scan to the individual ones of the shift register means in the plurality, the third means including means for decoding the additional words of digital information, the third means including additional shift register means for receiving and storing the decoded words from the decoding means and for transferring such decoded words from the additional shift register means in the same order as received, the third means including timing state means for operating upon the decoded words to obtain the controlled transfer of the words of the individual ones of the different types of digital information to the individual ones of the plurality of shift register means receiving such words.

93. In a combination as set forth in claim 92, the timing state means providing for the transfer of the words of standard interframe video information and graphics information at particular times for each line in the raster scan to the individual ones of the shift register means receiving such words and providing for the transfer of the words of television and audio information for each line in the raster scan to the individual ones of the shift register means receiving such words such that such transfer of the words of the television information and the audio information occurs for each line after the transfer of the standard video information and graphics information for such line but without reference to any particular time relative to such line.

94. In a combination as set forth in claim 93, the pixels in each line in the raster scan being presented at a particular clock frequency, the storage means constituting a DRAM, the third means being operative to transfer the words of the different types of digital information to the individual ones of the shift register means in the plurality at the particular clock frequency.

95. In a combination as set forth in claim 90, the individual ones of the shift register means for the words of television information and audio information having limited capacities, means for providing a control signal when the individual ones of the shift register means for the words of television information and audio information become filled for any line in the raster scan by the transfer of the words of the television and audio information to such shift register means, and means for interrupting the transfer of the words of the individual ones of the television and audio information to such individual ones of the shift register means for such line upon the occurrence of the control signal in such line.

96. In a combination as set forth in claim 90, each of the words of digital information being formed from a plurality of bits, the second means being operative to transfer the bits in each word in parallel between the controller means and the storage means and from the controller means and the storage means to the shift register means in the plurality.

97. In combination for use with a monitor for displaying information, the monitor providing a raster scan defined by a plurality of lines and by a plurality of pixels generated in each line:

controller means for providing words of different types of digital information selected from a group including standard interframe video information, graphics information, television information and audio information, storage means for storing the words of the different types of digital information, a plurality of shift register means each operative to receive and store the words of digital information for an individual one of the different types of digital information and to transfer such words from such shift register means in the same order as received, a bus connected to the controller means, the storage means and the shift register means in the plurality and providing successive words of digital information representing data and other words of digital information representing the destination of such data among the controller means, the storage means and the shift register means in the plurality, and first means for directing the individual ones of the words of digital information from the storage means through the bus to the individual ones of the shift register means in the plurality in accordance with the information in such other ones of such words.

98. In combination for use with a monitor for displaying information, the monitor providing a raster scan defined by a plurality of lines and by a plurality of pixels generated in each line:

controller means for providing bytes of different words of digital information selected from a group including standard interframe video information, graphics information, television information and audio information, storage means for storing the words of the different types of digital information, a plurality of shift register means each operative to receive and store the words of digital information for an individual one of the different types of digital information and to transfer such words from such shift register means in the same order as received, a bus extending between the controller means, the storage means and the shift register means in the plurality and providing successive words of digital information representing data and other words of digital information representing the destination of such data among the controller means, the storage means and the shift register means in the plurality, and first means for directing the individual ones of the words of digital information from the storage means to the individual ones of the shift register means in the plurality in accordance with the information in such other ones of such words, each of the other ones of the words including a plurality of bits, first ones of which indicate that second ones of the bits in such words contain information indicating the destination of successive ones of the words, the first means including second means responsive to the first bits in such other ones of the words for decoding the second bits in such other ones of the words and for directing such successive ones of the words through the bus to the individual ones of the shift register means in the plurality in accordance with such decoding.

99. In combination for use with a monitor for displaying information, the monitor providing a raster scan defined by a plurality of lines and by a plurality of pixels generated in each line:

controller means for providing words of different types of digital information selected from a group including standard interframe video information, graphics information, television information and audio information, storage means for storing the words of the different types of digital information, a plurality of shift register means each operative to receive and store the words of digital information for an individual one of the different types of digital information and to transfer such words from such shift register means in the same order as received, a bus extending between the controller means, the storage means and the shift register means in the plurality and providing successive words of digital information representing data and other words of digital information representing the destination of such data among the controller means, the storage means and the shift register means in the plurality, and first means for directing the individual ones of the words of digital information from the storage means to the individual ones of the shift register means in the plurality in accordance with the information in such other ones of such words, the second bits in the other ones of the words providing digital information indicating the timing of the transfer, for each line in the raster scan in the monitor, of the successive ones of the words into the individual ones of the shift register means in the plurality receiving such individual ones of the different types of digital information, and the first means including third means responsive to the digital information indicating such timing for directing the successive ones of the words through the bus to such individual ones of the shift register means in the plurality in accordance with such timing.

100. In a combination as set forth in claim 99, the pixels in each line in the raster scan in the monitor being presented at a first frequency, the shift register means for the graphics information having a capacity less than that for storing the words for all of the pixels in each line, the graphics information being transferable into the shift register means for the graphics information at a second frequency less than the first frequency, and the third means being operative to initiate the transfer of the words of the graphics information into the shift register means for such graphics information at a time for each line to substantially fill, without any overflow, such shift register means for such line during the transfer of the words of the graphics information for such line to such shift register means.

101. In a combination as set forth in claim 99, the pixels in each line in the raster scan in the monitor being presented at a first frequency, the shift register means for an individual one of the television and audio information having a capacity less than that for storing the words for all of the pixels in each line, the words for the individual one of the television and audio information being transferable into the individual one of the shift register means for such individual one of the television and audio information at a second frequency less than the first frequency, the third means being operative to transfer for each line the words of such individual one of the television information and the audio information into such individual one of the shift register means for such line but without any particular timing for such line, and fourth means for interrupting the transfer for each line of the words of such individual one of the television information and audio information into such shift register means for such line when such shift register means becomes filled to a particular capacity for such line.

102. In combination for use with a monitor for displaying information, the monitor providing a raster scan defined by a plurality of lines and by a plurality of pixels in each line:

controller means for providing words of different types of digital information selected from a group including standard interframe video information, graphics information, television information and audio information, storage means for storing the words of the different types of digital information, a plurality of shift register means each operative to receive and store the words of digital information for an individual one of the different types of digital information and to transfer such words from such shift register means in the same order as received, a bus connected to the controller means, the storage means and the shift register means in the plurality and providing successive words, first ones of which provide the individual ones of the different types of digital information and second ones of which indicate the individual ones of the shift register means in the plurality to receive the successive words after such second ones of the words and also providing indications controlling the processing of the indications in such successive ones of the words, each of the words having a particular bit indicating whether such word constitutes one of the first ones of the words or one of the second ones of the words, first means for processing the words in the individual ones of the shift register means in the plurality, second means responsive to the particular bit in each word for determining whether such word constitutes one of the first words or one of the second words, third means responsive to the determination by the second means for decoding the word when the determination by the second means is that the word constitutes one of the second words, and fourth means responsive to the decoding provided by the third means for one of the second words for passing the successive words to an individual one of the shift register means in the plurality in accordance with such decoding.

103. In combination for use with a monitor for displaying information, the monitor providing a raster scan defined by a plurality of lines and by a plurality of pixels in each line:

controller means for providing words of different types of digital information selected from a group including standard interframe video information, graphics information, television information and audio information, storage means for storing the words of the different types of digital information, a plurality of shift register means each operative to receive and store the words of digital information for an individual one of the different tapes of digital information and to transfer such words from such shift register means in the same order as received, a bus extending between the controller means, the storage means and the shift register means in the plurality and providing successive words first ones of which provide the individual ones of the different types of digital information and second ones of which indicate the individual ones of the shift register means in the plurality to receive the successive words after such second ones of the words and also providing indications controlling the processing of the indications in such successive words, each of the bytes having a particular bit indicating whether such word constitutes one of the first ones or one of the second ones of the words, first means for processing the words in the individual ones of the shift register means in the plurality, second means responsive to the particular bit in each word for determining whether such word constitutes one of the first words or one of the second words, third means responsive to the determination by the second means for decoding the word when the determination is that the word constitutes one of the second words, and fourth means responsive to the decoding provided by the third means for one of the second words for passing the successive words to an individual one of the shift register means in the plurality in accordance with such decoding, the shift register means in the plurality for the graphics information having a capacity less than the number of pixels in each line in the raster scan in the monitor, and means for initiating the transfer of the words of the graphics information from the storage means to the shift register means in the plurality for such graphics information at a particular time in each line to provide for a substantially full, but not an overflowing, use of the capacity of the shift register means in such line during the transfer of the words of the graphics information to such shift register means for such line.

104. In a combination as set forth in claim 103, means for initiating the transfer of the words of the standard interframe video information into the shift register means in the plurality for such standard interframe video information at a particular time for each line relative to the transfer in such line of the words of the graphics information into the individual one of the shift register means in the plurality for such graphics information.

105. In a combination as set forth in claim 103, means for initiating the transfer of the words of the television information and the audio information into individual ones of the shift register means in the plurality for such information at a time in each line after the transfer of the standard interframe video information and the graphics information for such line into the individual ones of the shift register means for such standard interframe video information and such graphics information but without any reference to any particular time in such line.

106. In a combination as set forth in claim 105, the shift register means in the plurality for at least one of the television information and the audio information having limited capacities, means responsive to an overflow of the capacity in the shift register means for the at least one of the television information and the audio information for one of the lines in the raster scan for producing a control signal, and means responsive to the control signal for discontinuing the transfer of the words for such line of the at least one of the television information and the audio information into the shift register means receiving such words.

107. In a combination as set forth in claim 102, the storage means constituting at least one dynamic RAM.

108. In a combination as set forth in claim 1, a common bus connecting the first through twelfth means.

109. In a combination as set forth in claim 1, a first bus for transferring the stored signals from the fifth means to the sixth through the ninth means and the eleventh means, and a second bus connecting the first through fifth means and the twelfth means.

110. In a combination as set forth in claim 6, a common bus for connecting the storage means, the shift register means and the controller.

111. In a combination as set forth in claim 6, a first bus connecting the storage means and the controller for providing for the transfer of the words of audio information from the controller to the storage means for storage in the storage means, and a second bus connecting the controller, the storage means and the shift register means to provide for the transfer of the words of the audio information from the storage means to the shift register means at the second particular frequency.

112. In a combination as set forth in claim 12, a common bus for connecting the storage means, the shift register means and the controller.

113. In a combination as set forth in claim 12, a first bus connecting the storage means and the controller for providing for the transfer of the words of the television information from the controller to the storage means for storage in the storage means, and a second bus connecting the controller, the storage means and the shift register means to provide for the transfer of the words of the television information from the storage means to the shift register means at the second particular frequency.

114. In a combination as set forth in claim 18, a common bus for the storage means, the plurality of shift register means and the controller means.

115. In a combination as set forth in claim 18, a first bus connecting the storage means and the controller means for providing for the transfer of the words of the different types of the digital information from the controller means to the storage means for storage in the storage means, and a second bus connecting the controller means, the storage means and the shift register means in the plurality to provide for the transfer of the words of the different types of digital information in the particular sequence to the individual ones of the shift register means in the plurality.

116. In a combination as set forth in claim 24, a common bus for connecting the storage means, the shift registers in the plurality and the first and second means.

117. In a combination as set for claim 30, a common bus for the storage means, the shift register means, the first means and the second means.

118. In a combination as set forth in claim 30, a first bus for providing for a transfer of the words of the different types of digital information from the first and second means to the storage means for storage in the storage means, and a second bus connecting the storage means, the shift register means in the plurality and the first and second means for transferring the words of the different types of digital information from the storage means to the shift register means in the plurality in accordance with the operation of the first second means.

119. In a combination as set forth in claim 34, a common bus for the storage means, the shift register means and the initiating means.

120. In a combination as set forth in claim 34, a first bus connected to the storage means and the second means for providing for a transfer of the words of the digital graphics information from the second means to the storage means for storage by the storage means, and a second bus connected to the storage means, the shift register means and the second means for transferring the words of the digital graphics information from the storage means to the shift register means.

121. In a combination as set forth in claim 44, the bus being connected to the storage means, the shift register means in the plurality and the additional shift register means.

122. In a combination as set forth in claim 57, a bus common to the first storage means, the shift register means in the plurality and the first means.

123. In a combination as set forth in claim 52, a first bus connecting the first means and the first storage means to transfer to the storage means the words indicative of the different type of binary information, and a second bus connecting the first storage means, the shift register means in the plurality and the first means for transferring the words indicative of the different types of binary information from the storage means to the shift register means in the plurality.

124. In a combination as set forth in claim 74, a common bus connecting the storage means, the shift register means in the plurality, the first means and the third means.

125. In a combination as set forth in claim 79, the first means including a first bus for transferring the words of the different types of digital information from the controller means to the storage means, and a second bus connecting the controller means, the storage means and the shift register means in the plurality for transferring the words of the different types of digital information from the storage means to the shift register means in the plurality.

126. In a combination as set forth in claim 79, a bus connecting the storage means, the shift register means in the plurality and the controller means.

* * * * *